US012094483B2

(12) United States Patent
Tsujimoto

(10) Patent No.: US 12,094,483 B2
(45) Date of Patent: Sep. 17, 2024

(54) SOUND PROCESSING APPARATUS AND CONTROL METHOD

(71) Applicant: CANON KABUSHIKI KAISHA, Tokyo (JP)

(72) Inventor: Yuki Tsujimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 17/740,089

(22) Filed: May 9, 2022

(65) Prior Publication Data

US 2022/0383891 A1 Dec. 1, 2022

(30) Foreign Application Priority Data

May 25, 2021 (JP) ................................ 2021-087690

(51) Int. Cl.

| | |
|---|---|
| ***G10L 21/0232*** | (2013.01) |
| ***G10L 25/18*** | (2013.01) |
| ***H04R 1/02*** | (2006.01) |
| ***H04R 1/40*** | (2006.01) |
| ***H04R 3/00*** | (2006.01) |
| *G10L 21/0216* | (2013.01) |

(52) U.S. Cl.

CPC .......... *G10L 21/0232* (2013.01); *G10L 25/18* (2013.01); *H04R 1/028* (2013.01); *H04R 1/406* (2013.01); *H04R 3/005* (2013.01); *G10L 2021/02165* (2013.01); *H04R 2410/01* (2013.01); *H04R 2410/05* (2013.01); *H04R 2499/11* (2013.01)

(58) Field of Classification Search

CPC ................ G10L 21/0232; G10L 25/18; G10L 2021/02165; H04R 1/028; H04R 1/406; H04R 3/005; H04R 2410/01; H04R 2410/05; H04R 2499/11

USPC .................. 381/56, 58, 92, 71.1, 71.3, 71.9

See application file for complete search history.

(56) References Cited

U.S. PATENT DOCUMENTS 11,657,794 B2 * 5/2023 Tsujimoto ........... H04R 1/1083 381/71.1
2003/0161484 A1 * 8/2003 Kanamori ............. H04R 3/005 381/71.7

(Continued)

FOREIGN PATENT DOCUMENTS

JP 2011205527 A 10/2011

*Primary Examiner* — William A Jerez Lora
(74) *Attorney, Agent, or Firm* — Canon U.S.A., Inc. IP Division

(57) ABSTRACT

A sound processing apparatus includes a first microphone that acquires an environmental sound, a second microphone that acquires noise from a noise source, a first conversion unit that performs Fourier transform on a sound signal from the first microphone to generate first sound data, a second conversion unit that performs Fourier transform on a sound signal from the second microphone to generate second sound data, a first reduction unit that reduces noise from the noise source in the first sound data using noise data, a detection unit detects, based on the second sound data, that short-term noise from the noise source is included in the first sound data, a second reduction unit that controls a magnitude of sound data from the first reduction unit and reduces the short-term noise, and a third conversion unit that performs inverse Fourier transform on sound data from the second reduction unit.

12 Claims, 11 Drawing Sheets

(56) References Cited

U.S. PATENT DOCUMENTS

| | | | | |
|---|---|---|---|---|
| 2014/0169581 A1* | 6/2014 | Osako | G10L 21/0216 | 381/73.1 |
| 2015/0003627 A1* | 1/2015 | Andrea | H04R 3/005 | 381/71.7 |

* cited by examiner

SOUND SIGNAL

UNITS OF REDUCTION PROCESS

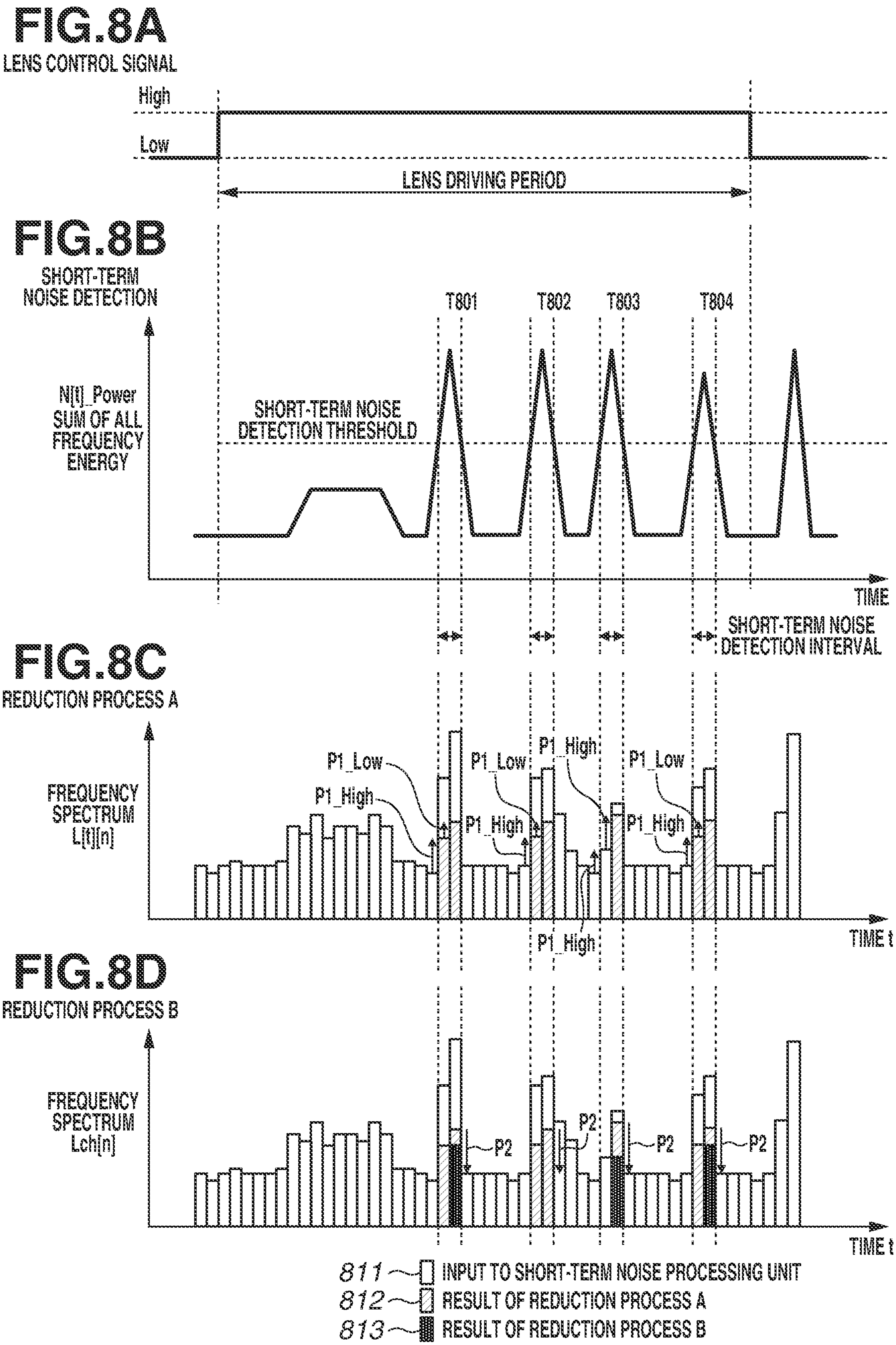
FIG.8A
LENS CONTROL SIGNAL
High
Low
LENS DRIVING PERIOD
FIG.8B
SHORT-TERM NOISE DETECTION
T801
T802
T803
T804
N[t]_Power SUM OF ALL FREQUENCY ENERGY
SHORT-TERM NOISE DETECTION THRESHOLD
TIME
SHORT-TERM NOISE DETECTION INTERVAL
FIG.8C
REDUCTION PROCESS A
FREQUENCY SPECTRUM L[t][n]
P1_Low
P1_High
P1_Low
P1_High
P1_High
P1_Low
P1_High
P1_High
TIME t
FIG.8D
REDUCTION PROCESS B
FREQUENCY SPECTRUM Lch[n]
P2
P2
P2
P2
TIME t
811 INPUT TO SHORT-TERM NOISE PROCESSING UNIT
812 RESULT OF REDUCTION PROCESS A
813 RESULT OF REDUCTION PROCESS B

FIG.10

| NAME | TYPE OF NOISE | [0] | [1] | [2] | | [N-1] | [N] | [N+1] | | [511] | [512] |
|---|---|---|---|---|---|---|---|---|---|---|---|
| PL1A | LENS 1 | 0 | 0 | 0 | ··· | 0.50 | 0.88 | 0.79 | ··· | 0 | 0 |
| PL2A | LENS 2 | 0 | 0 | 0 | ··· | 0.85 | 0.86 | 0.88 | ··· | 0 | 0 |
| PL3A | SHORT-TERM NOISE | 0 | 0 | 0 | ··· | 0.80 | 0.79 | 0.85 | ··· | 0 | 0 |
| PL4A | LONG-TERM NOISE | 0 | 0 | 0 | ··· | 0.79 | 0.88 | 0.80 | ··· | 0 | 0 |
| | ⋮ | | | | | | | | | | |
| PL1B | WHITE NOISE | 0 | 0 | 0 | ··· | 0.33 | 0.45 | 0.17 | ··· | 0 | 0 |
| PL2B | FRAME RATE 1 | 0 | 0 | 0 | ··· | 0.20 | 0.17 | 0.22 | ··· | 0 | 0 |
| PL3B | FRAME RATE 2 | 0 | 0 | 0 | ··· | 0.23 | 0.15 | 0.11 | ··· | 0 | 0 |
| | ⋮ | | | | ··· | | | | ··· | | |
| PR1A | LENS 1 | 0 | 0 | 0 | ··· | 0.60 | 0.55 | 0.78 | ··· | 0 | 0 |
| PR2A | LENS 2 | 0 | 0 | 0 | ··· | 0.55 | 0.86 | 0.88 | ··· | 0 | 0 |
| PR3A | SHORT-TERM NOISE | 0 | 0 | 0 | ··· | 0.65 | 0.78 | 0.80 | ··· | 0 | 0 |
| PR4A | LONG-TERM NOISE | 0 | 0 | 0 | ··· | 0.77 | 0.72 | 0.71 | ··· | 0 | 0 |
| | ⋮ | | | | | | | | | | |
| PR1B | WHITE NOISE | 0 | 0 | 0 | ··· | 0.42 | 0.62 | 0.23 | ··· | 0 | 0 |
| PR2B | FRAME RATE 1 | 0 | 0 | 0 | ··· | 0.20 | 0.17 | 0.22 | ··· | 0 | 0 |
| PR3B | FRAME RATE 2 | 0 | 0 | 0 | ··· | 0.23 | 0.44 | 0.15 | ··· | 0 | 0 |
| | ⋮ | | | | ··· | | | | ··· | | |

SOUND PROCESSING APPARATUS AND CONTROL METHOD

BACKGROUND

Field

The present disclosure relates to a sound processing apparatus.

Description of the Related Art

A digital camera as an example of a sound processing apparatus can record moving image data and a sound around the digital camera. The digital camera also has an autofocus function to focus on an object by driving a lens while recording moving image data. The digital camera also has a function of zooming in on an object by driving a lens while recording a moving image.

If a lens is driven while a moving image is being recorded, the driving sound of an optical lens may be included as noise in a sound recorded with the moving image. In response, conventionally, if the digital camera collects as noise a sliding contact sound generated by a lens when the lens is driven, the digital camera can record a sound around the digital camera while reducing the noise. Japanese Patent Application Laid-Open No. 2011-205527 discusses a digital camera that reduces noise using a spectral subtraction method.

The digital camera discussed in Japanese Patent Application Laid-Open No. 2011-205527, however, creates a noise pattern from noise collected by a microphone for recording a sound around the digital camera, and therefore may not be able to acquire an accurate noise pattern from the sliding contact sound of a lens generated within a housing of the camera. In this case, the digital camera may not be able to effectively reduce noise included in the collected sound, particularly noise generated by the intermittent driving of a driving unit or short-term noise generated by a collision of gears.

SUMMARY

According to an aspect of the embodiments, short-term noise is effectively reduced.

According to an aspect of the embodiments, there is provided a sound processing apparatus including a first microphone that acquires an environmental sound, a second microphone that acquires noise from a noise source, a processor, and a memory that stores a program that, when executed by the processor, causes the sound processing apparatus to function as a first conversion unit configured to perform Fourier transform on a sound signal acquired by the first microphone to generate first sound data, a second conversion unit configured to perform Fourier transform on a sound signal acquired by the second microphone to generate second sound data, a first reduction unit configured to generate noise data based on the second sound data and reduce noise from the noise source in the first sound data using the noise data, a detection unit configured to, based on the second sound data, detect that short-term noise from the noise source is included in the first sound data, a second reduction unit configured to, in a case where the detection unit detects that the short-term noise is included in the first sound data, control a magnitude of sound data output from the first reduction unit and reduce the short-term noise in the sound data output from the first reduction unit, and a third conversion unit configured to perform inverse Fourier transform on sound data output from the second reduction unit.

Further features of the present disclosure will become apparent from the following description of exemplary embodiments with reference to the attached drawings.

BRIEF DESCRIPTION OF THE DRAWINGS

FIGS. 8A to 8D area timing chart illustrating short-term noise reduction processes A and B performed by the short-term noise processing unit according to one or more aspects of the present disclosure.

FIG. 10 is a diagram illustrating noise parameters according to one or more aspects of the present disclosure.

DESCRIPTION OF THE EMBODIMENTS

With reference to the drawings, exemplary embodiments of the present disclosure will be described in detail below.

External Views of Imaging Apparatus 100

Figure 1A:
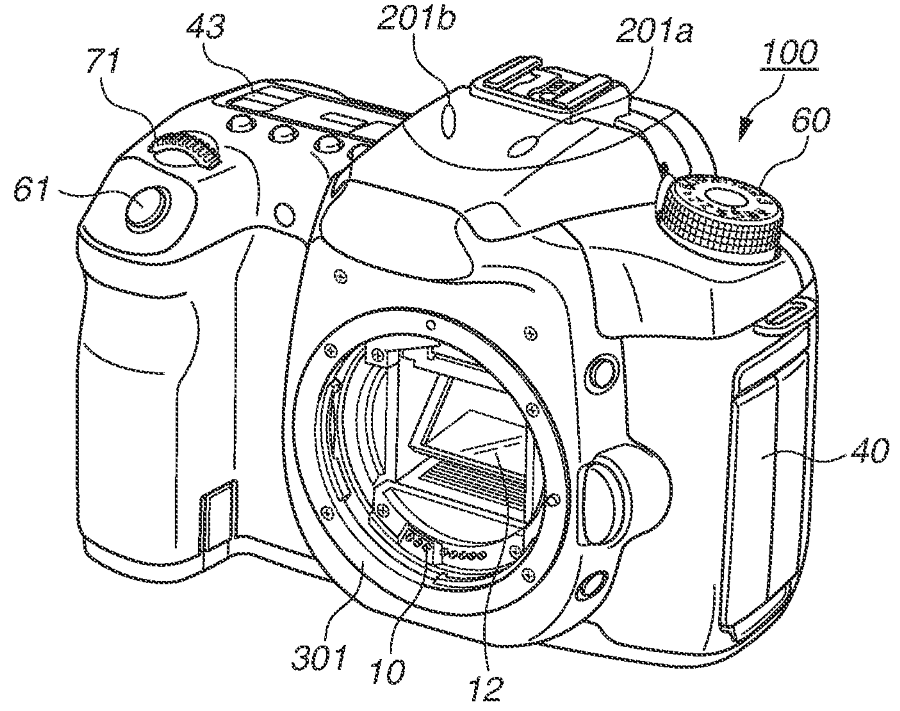
FIGS. 1A and 1B are perspective views of an imaging apparatus according to one or more aspects of the present disclosure.
Figure 1B:
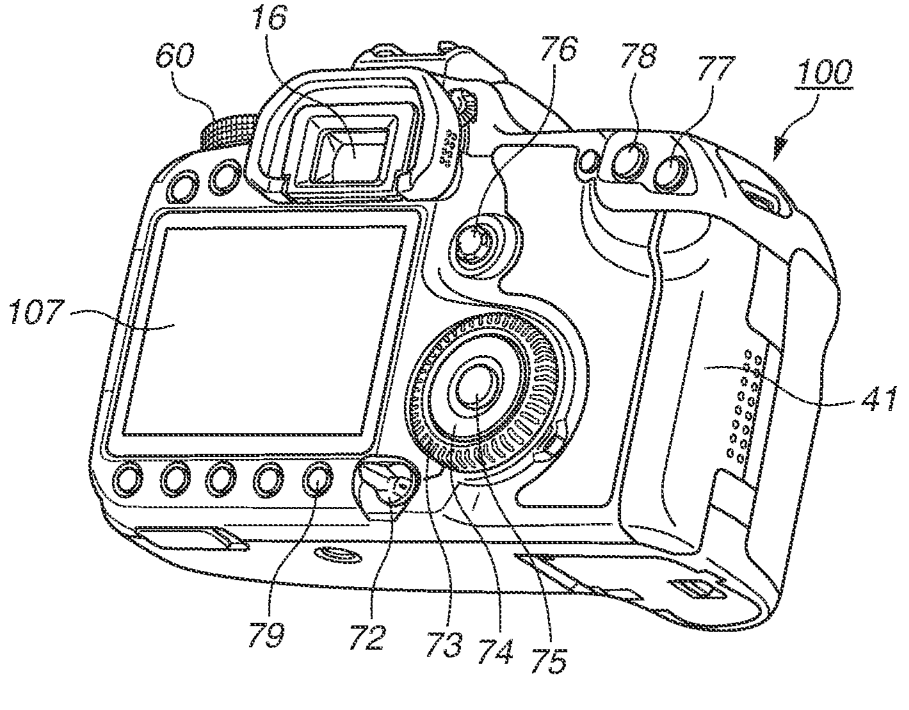

A first exemplary embodiment of the present disclosure will be described. FIGS. 1A and 1B illustrate examples of external views of an imaging apparatus 100 according to the present exemplary embodiment as an example of a sound processing apparatus to which the present disclosure is applicable. FIG. 1A is an example of a front perspective view of the imaging apparatus 100. FIG. 1B is an example of a rear perspective view of the imaging apparatus 100. In FIGS. 1A and 1B, an optical lens (not illustrated) is attached to a lens mount 301.

A display unit 107 displays image data and text information. The display unit 107 is provided on the back surface of the imaging apparatus 100. An outside-viewfinder display unit 43 is a display unit provided on the upper surface of the imaging apparatus 100. The outside-viewfinder display unit 43 displays the setting values, such as the shutter speed and the stop value, of the imaging apparatus 100. An eyepiece viewfinder 16 is a look-in type viewfinder. A user observes a focusing screen in the eyepiece viewfinder 16 to check the focal point of an optical image of an object and the composition of the image.

A release switch 61 is an operation member for the user to give an image capturing instruction. A mode selection switch 60 is an operation member for the user to give an instruction to switch to various modes. A main electronic dial 71 is a rotary operation member. By rotating the main electronic dial 71, the user can change the setting values, such as the shutter speed and the stop value, of the imaging apparatus 100. The release switch 61, the mode selection switch 60, and the main electronic dial 71 are included in an operation unit 112.

A power switch 72 is an operation member for the user to give instructions to turn on and off the imaging apparatus 100. A sub electronic dial 73 is a rotary operation member. The user can move a selection frame displayed on the display unit 107 and advance an image in a reproduction mode by operating the sub electronic dial 73. A directional pad 74 is a four-direction key of which the upper, lower, left, and right portions can be pushed in. The imaging apparatus 100 executes processing according to a pushed portion (direction) of the directional pad 74. The power switch 72, the sub electronic dial 73, and the directional pad 74 are included in the operation unit 112.

A SET button 75 is a push button. The SET button 75 is mainly used by the user to determine a selection item displayed on the display unit 107. An LV button 76 is a button used to switch the on and off states of live view (hereinafter, "LV"). The LV button 76 is used to give instructions to start and stop the capturing (recording) of a moving image in a moving image recording mode. An enlargement button 77 is a push button for the user to give instructions to, in the display of live view in an image capturing mode, turn on and off an enlargement mode and change the enlargement ratio in the enlargement mode. The SET button 75, the LV button 76, and the enlargement button 77 are included in the operation unit 112.

In the reproduction mode, the enlargement button 77 functions as a button for the user to give an instruction to increase the enlargement ratio of image data displayed on the display unit 107. A reduction button 78 is a button for the user to give an instruction to reduce the enlargement ratio of image data displayed in an enlarged manner on the display unit 107. A reproduction button 79 is an operation button for the user to give an instruction to switch between the image capturing mode and the reproduction mode. If the user presses the reproduction button 79 in the image capturing mode of the imaging apparatus 100, the imaging apparatus 100 transitions to the reproduction mode, and the display unit 107 displays image data recorded in a recording medium 110. The reduction button 78 and the reproduction button 79 are included in the operation unit 112.

An instant return mirror 12 (hereinafter, "mirror 12") is a mirror for switching a light beam incident from the optical lens attached to the imaging apparatus 100 to make the light beam incident on either of the eyepiece viewfinder 16 side and an image capturing unit 101 side. The mirror 12 is moved up and down by a control unit 111 controlling an actuator (not illustrated) when exposure is performed, when an image is captured while displaying a live view, or when a moving image is captured. Normally, the mirror 12 is disposed to make the light beam incident on the eyepiece viewfinder 16. In a case where an image is captured or a live view is displayed, the mirror 12 flips up so that the light beam is incident on the image capturing unit 101 (mirror-up).

A center portion of the mirror 12 is a one-way mirror. A part of the light beam having passed through the center portion of the mirror 12 is incident on a focus detection unit (not illustrated) for detecting a focus.

A communication terminal 10 is a communication terminal for an optical lens 300 attached to the imaging apparatus 100 and the imaging apparatus 100 to communicate with each other. A terminal cover 40 is a cover that protects a connection cable connector (not illustrated) for connecting a connection cable for an external device and the imaging apparatus 100. A cover 41 is a cover of a slot in which the recording medium 110 is stored. The lens mount 301 is an attachment portion to which the optical lens 300 (not illustrated) can be attached.

An L-microphone 201*a* and an R-microphone 201*b* are microphones for collecting the voice of the user. As viewed from the back surface of the imaging apparatus 100, the L-microphone 201*a* is placed on the left side, and the R-microphone 201*b* is placed on the right side.

Configuration of Imaging Apparatus 100

Figure 2:
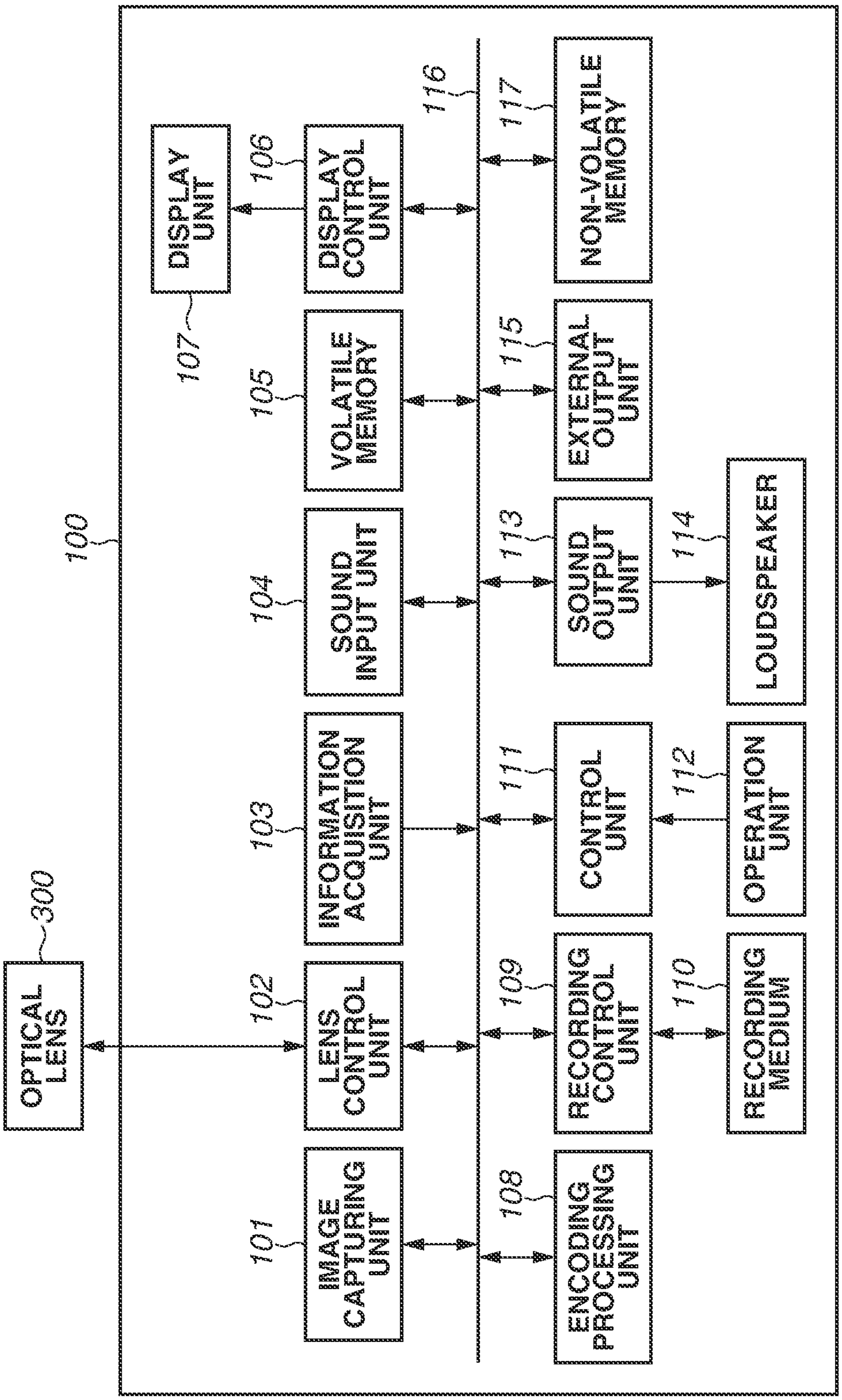
FIG. 2 is a block diagram illustrating a configuration of the imaging apparatus according to one or more aspects of the present disclosure.

FIG. 2 is a block diagram illustrating an example of the configuration of the imaging apparatus 100.

The optical lens 300 is a lens unit attachable to and detachable from the imaging apparatus 100. For example, the optical lens 300 is a zoom lens or a variable focal lens. The optical lens 300 includes an optical lens, a motor that drives the optical lens, and a communication unit that communicates with a lens control unit 102 of the imaging apparatus 100. The optical lens 300 moves the optical lens using the motor based on a control signal received by the communication unit and thereby can focus on and zoom in on an object and correct camera shake.

The image capturing unit 101 includes an image sensor that converts an optical image of the object formed on an imaging surface through the optical lens 300 into an electric signal, and an image processing unit that generates image data or moving image data from the electric signal generated by the image sensor and outputs the image data or the moving image data. The image sensor is, for example, a charge-coupled device (CCD) sensor or a complementary metal-oxide-semiconductor (CMOS) sensor. In the present exemplary embodiment, a series of processes in which the image capturing unit 101 generates and outputs image data including still image data and moving image data is referred to as "image capturing". In the imaging apparatus 100, the image data is recorded in the recording medium 110 according to the Design Rule for Camera File system (DCF) standard.

Based on data output from the image capturing unit 101 and a control signal output from the control unit 111, the lens control unit 102 transmits a control signal to the optical lens 300 via the communication terminal 10, thereby controlling the optical lens 300.

An information acquisition unit 103 detects the tilt of the imaging apparatus 100 and the temperature within a housing of the imaging apparatus 100. For example, the information acquisition unit 103 detects the tilt of the imaging apparatus 100 using an acceleration sensor or a gyro sensor. For example, the information acquisition unit 103 detects the temperature within the housing of the imaging apparatus 100 using a temperature sensor.

A sound input unit 104 generates sound data from a sound acquired by a microphone. The sound input unit 104 acquires a sound around the imaging apparatus 100 using a microphone. The sound input unit 104 performs analog-to-digital conversion (A/D conversion) and various types of sound processing on the acquired sound, thereby generating sound data. The sound input unit 104 includes a microphone.

An example of the detailed configuration of the sound input unit 104 will be described below.

A volatile memory 105 temporarily records image data generated by the image capturing unit 101 and sound data generated by the sound input unit 104. The volatile memory 105 is also used as a temporary recording area for image data to be displayed on the display unit 107 and a work area for the control unit 111.

A display control unit 106 performs control to display image data output from the image capturing unit 101, text for an interactive operation, and a menu screen on the display unit 107. When a still image is captured or a moving image is captured, the display control unit 106 performs control to sequentially display image data output from the image capturing unit 101 on the display unit 107, and thereby the display unit 107 can function as an electronic viewfinder. For example, the display unit 107 is a liquid crystal display or an organic electroluminescent (EL) display. The display control unit 106 can also perform control to display image data and moving image data output from the image capturing unit 101, text for an interactive operation, and a menu screen on an external display via an external output unit 115.

An encoding processing unit 108 can encode image data and sound data temporarily recorded in the volatile memory 105. For example, the encoding processing unit 108 can generate encoded and compressed still image data by encoding and compressing image data according to the Joint Photographic Experts Group (JPEG) standard or a raw image format. For example, the encoding processing unit 108 can generate encoded and compressed moving image data by encoding and compressing moving image data according to the Moving Picture Experts Group (MPEG)-2 standard or the H.264/MPEG4-Advanced Video Coding (AVC) standard. For example, the encoding processing unit 108 can generate sound data by encoding and compressing sound data according to the Audio Code number 3 (AC3) standard, the Advanced Audio Coding (AAC) standard, the Adaptive Transform Acoustic Coding (ATRAC) standard, or an adaptive differential pulse-code modulation (ADPCM) method. For example, the encoding processing unit 108 may encode sound data so that the sound data is not compressed according to a linear pulse-code modulation (PCM) method.

A recording control unit 109 can record data in the recording medium 110 and read the data from the recording medium 110. For example, the recording control unit 109 can record still image data, moving image data, and sound data generated by the encoding processing unit 108 in the recording medium 110. The recording control unit 109 can also read the still image data, the moving image data, and the sound data from the recording medium 110. The recording medium 110 is, for example, an SD card, a CompactFlash (CF) card, an XQD memory card, a hard disk drive (HDD) (a magnetic disk), an optical disc, or a semiconductor memory. The recording medium 110 may be configured to be attachable to and detachable from the imaging apparatus 100 using an attachment/ejection mechanism (not illustrated), or may be built into the imaging apparatus 100. That is, the recording control unit 109 can have any configuration as long as it has at least a method for accessing the recording medium 110.

According to an input signal and a program described below, the control unit 111 controls the components of the imaging apparatus 100 via a data bus 116. The control unit 111 includes a central processing unit (CPU) as a hardware processor that executes various types of control, a read-only memory (ROM), and a random-access memory (RAM). Instead of the control unit 111 controlling the entirety of the imaging apparatus 100, a plurality of pieces of hardware may control the imaging apparatus 100 in a shared manner.

The ROM included in the control unit 111 stores a program for controlling the components. The RAM included in the control unit 111 is a volatile memory used for a calculation process.

The operation unit 112 is a user interface that receives an instruction issued by the user to the imaging apparatus 100. The operation unit 112 includes, for example, the power switch 72 for giving instructions to turn on and off the imaging apparatus 100, the release switch 61 for giving an instruction to capture an image, the reproduction button 79 for giving an instruction to reproduce image data or moving image data, and the mode selection switch 60.

According to an operation of the user, the operation unit 112 outputs a control signal to the control unit 111. A touch panel included in the display unit 107 can also be included in the operation unit 112. The release switch 61 includes switches SW1 and SW2. When the release switch 61 enters a half press state, the switch SW1 is turned on. Consequently, the operation unit 112 receives a preparation instruction to perform a preparation operation for capturing an image, such as an autofocus (AF) process, an automatic exposure (AE) process, an automatic white balance (AWB) process, or an electronic flash pre-emission (EF) process. When the release switch 61 enters a full press state, the switch SW2 is turned on. By such a user operation, the operation unit 112 receives an image capturing instruction to perform an image capturing operation. The operation unit 112 also includes an operation member (e.g., a button) with which the user can adjust the sound volume of sound data reproduced from a loudspeaker 114.

A sound output unit 113 can output sound data to the loudspeaker 114 and the external output unit 115. Sound data to be input to the sound output unit 113 is sound data read from the recording medium 110 by the recording control unit 109, sound data output from a non-volatile memory 117, or sound data output from the encoding processing unit 108. The loudspeaker 114 is an electroacoustic converter capable of reproducing sound data.

The external output unit 115 can output image data, moving image data, and sound data to an external device. The external output unit 115 includes, for example, a video terminal, a microphone terminal, and a headphone terminal.

The data bus 116 is a data bus for transmitting various types of data such as sound data, moving image data, and image data and various control signals to the blocks of the imaging apparatus 100.

The non-volatile memory 117 is a non-volatile memory and stores the program described below to be executed by the control unit 111. In the non-volatile memory 117, sound data is recorded. The sound data is sound data on an electronic sound such as a focusing sound that is output from the loudspeaker 114 in a case where the object is brought into focus, an electronic shutter sound that is output from the loudspeaker 114 in a case where an instruction to capture an image is given, or an operation sound that is output from the loudspeaker 114 in a case where the imaging apparatus 100 is operated.

Operations of Imaging Apparatus 100

The operations of the imaging apparatus 100 according to the present exemplary embodiment are described.

When the user gives an instruction to turn on the imaging apparatus 100 by operating the power switch 72, the imaging apparatus 100 according to the present exemplary embodiment supplies power from a power supply (not illustrated) to the components of the imaging apparatus 100. For example, the power supply is a battery such as a lithium-ion battery or an alkaline manganese dry battery.

Upon the supply of power, the control unit 111 determines the operation mode of the imaging apparatus 100 based on the state of the mode selection switch 60. For example, the control unit 111 determines in which of the image capturing mode and the reproduction mode the imaging apparatus 100 is to operate. In the moving image recording mode, the control unit 111 performs control to record moving image data output from the image capturing unit 101 and sound data output from the sound input unit 104 as a single piece of moving image data with sound. In the reproduction mode, the control unit 111 controls the recording control unit 109 to read image data or moving image data recorded in the recording medium 110 and controls the display unit 107 to display the image data or the moving image data.

First, the moving image recording mode is described. In the moving image recording mode, first, the control unit 11 transmits a control signal to the components of the imaging apparatus 100 to cause the imaging apparatus 100 to transition to an image capturing standby state. For example, the control unit 111 controls the image capturing unit 101 and the sound input unit 104 to perform the following operations.

The image capturing unit 101 causes the image sensor to convert an optical image of the object formed on the imaging surface through the optical lens 300 into an electric signal and generates moving image data from the electric signal generated by the image sensor. Then, the image capturing unit 101 transmits the moving image data to the display control unit 106, and the display unit 107 displays the moving image data. The user can prepare to capture an image while viewing the moving image data displayed on the display unit 107.

The sound input unit 104 performs A/D conversion on analog sound signals input from a plurality of microphones, thereby generating a plurality of digital sound signals. Then, the sound input unit 104 generates sound data with a plurality of channels from the plurality of digital sound signals. The sound input unit 104 transmits the generated sound data to the sound output unit 113 and causes the loudspeaker 114 to reproduce the sound data. While listening to the sound data reproduced from the loudspeaker 114, the user can adjust the sound volume of the sound data recorded in moving image data with sound using the operation unit 112.

Next, when the user presses the LV button 76, the control unit 111 transmits an instruction signal for starting the capturing of an image to the components of the imaging apparatus 100. For example, the control unit 111 controls the image capturing unit 101, the sound input unit 104, the encoding processing unit 108, and the recording control unit 109 to perform the following operations.

The image capturing unit 101 causes the image sensor to convert an optical image of the object formed on the imaging surface through the optical lens 300 into an electric signal and generates moving image data from the electric signal generated by the image sensor. Then, the image capturing unit 101 transmits the moving image data to the display control unit 106, and the display unit 107 displays the moving image data. The image capturing unit 101 also transmits the generated moving image data to the volatile memory 105.

The sound input unit 104 performs A/D conversion on analog sound signals input from a plurality of microphones, thereby generating a plurality of digital sound signals. Then, the sound input unit 104 generates sound data with a plurality of channels from the plurality of digital sound signals. Then, the sound input unit 104 transmits the generated sound data to the volatile memory 105.

The encoding processing unit 108 reads and encodes moving image data and sound data temporarily recorded in the volatile memory 105. The control unit 111 generates a data stream from the moving image data and the sound data encoded by the encoding processing unit 108 and outputs the data stream to the recording control unit 109. According to a file system such as Universal Disk Format (UDF) or File Allocation Table (FAT), the recording control unit 109 records the input data stream as moving image data with sound in the recording medium 110.

The components of the imaging apparatus 100 continue the above operations while a moving image is being captured.

Then, when the user presses the LV button 76, the control unit 111 transmits an instruction signal for ending the capturing of the image to the components of the imaging apparatus 100. For example, the control unit 111 controls the image capturing unit 101, the sound input unit 104, the encoding processing unit 108, and the recording control unit 109 to perform the following operations.

The image capturing unit 101 stops the generation of the moving image data. The sound input unit 104 stops the generation of the sound data.

The encoding processing unit 108 reads and encodes the remaining moving image data and sound data recorded in the volatile memory 105. The control unit 111 generates a data stream from the moving image data and the sound data encoded by the encoding processing unit 108 and outputs the data stream to the recording control unit 109.

According to a file system such as UDF or FAT, the recording control unit 109 records the data stream as a file of moving image data with sound in the recording medium 110. Then, upon the stop of the input of the data stream, the recording control unit 109 completes the moving image data with sound. Upon the completion of the moving image data with sound, the recording operation of the imaging apparatus 100 stops.

Upon the stop of the recording operation, the control unit 111 transmits a control signal to the components of the imaging apparatus 100 to cause the imaging apparatus 100 to transition to the image capturing standby state. Consequently, the control unit 111 controls the imaging apparatus 100 to return to the image capturing standby state.

Next, the reproduction mode is described. In the reproduction mode, the control unit 111 transmits a control signal to the components of the imaging apparatus 100 to cause the imaging apparatus 100 to transition to a reproduction state. For example, the control unit 111 controls the encoding processing unit 108, the recording control unit 109, the display control unit 106, and the sound output unit 113 to perform the following operations.

The recording control unit 109 reads moving image data with sound recorded in the recording medium 110 and transmits the read moving image data with sound to the encoding processing unit 108.

The encoding processing unit 108 decodes image data and sound data from the moving image data with sound. The encoding processing unit 108 transmits the decoded image data to the display control unit 106 and the decoded sound data to the sound output unit 113.

The display control unit 106 causes the display unit 107 to display the decoded image data. The sound output unit 113 causes the loudspeaker 114 to reproduce the decoded sound data.

As described above, the imaging apparatus 100 according to the present exemplary embodiment can record and reproduce image data and sound data.

The sound input unit 104 executes sound processing such as the process of adjusting the level of a sound signal input from a microphone. Upon the start of the recording of a moving image, the sound input unit 104 executes the sound processing. Alternatively, the sound processing may be executed after the imaging apparatus 100 is turned on. Yet alternatively, the sound processing may be executed upon the selection of the image capturing mode. Yet alternatively, the sound processing may be executed upon the selection of the moving image recording mode or a mode related to the recording of a sound, such as a voice memo function. Yet alternatively, the sound processing may be executed upon the start of the recording of a sound signal.

Configuration of Sound Input Unit 104

Figure 3:
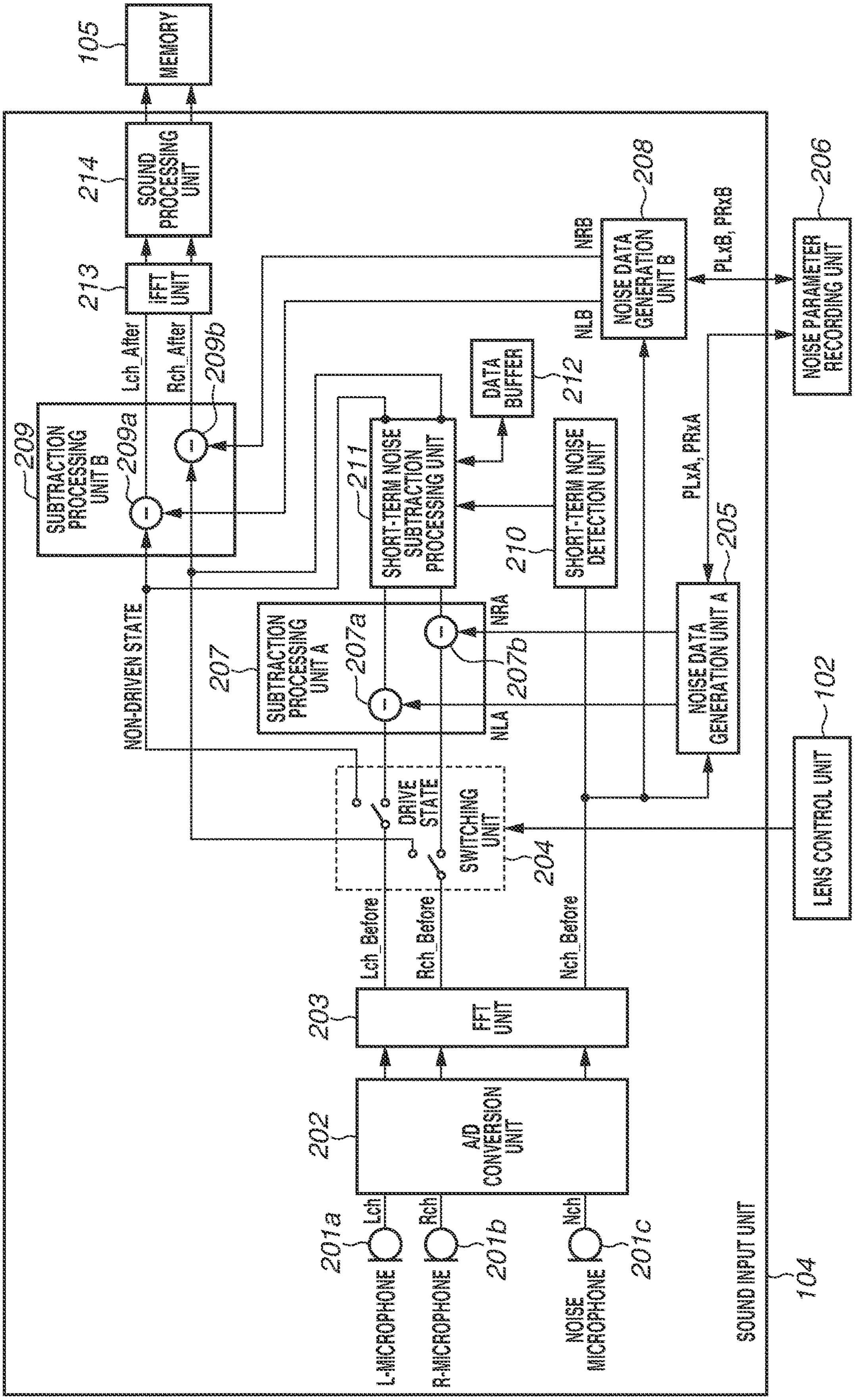
FIG. 3 is a block diagram illustrating a configuration of a sound input unit of the imaging apparatus according to one or more aspects of the present disclosure.

FIG. 3 is a block diagram illustrating an example of the detailed configuration of the sound input unit 104.

The sound input unit 104 includes three microphones such as the L-microphone 201*a*, the R-microphone 201*b*, and a noise microphone 201*c*. Each of the L-microphone 201*a* and the R-microphone 201*b* is an example of a first microphone. In the present exemplary embodiment, the imaging apparatus 100 acquires an environmental sound using the L-microphone 201*a* and the R-microphone 201*b* and records sound signals input from the L-microphone 201*a* and the R-microphone 201*b*, using a stereo method. For example, examples of the environmental sound include the voice of the user, the cry of an animal, the sound of rain, or a musical composition. That is, the environmental sound includes a sound generated outside the housing of the imaging apparatus 100 and the sound of the optical lens 300 generated outside the housing.

The noise microphone 201*c* is an example of a second microphone. The noise microphone 201*c* is a microphone for acquiring noise generated within the housing of the imaging apparatus 100 and noise generated within the housing of the optical lens 300. The noise generated within the housing of the imaging apparatus 100 and the noise generated within the housing of the optical lens 300 are noise such as a driving sound from a predetermined noise source. The predetermined noise source is, for example, a driving unit for an ultrasonic motor (hereinafter, "USM") or a stepper motor (hereinafter, "STM"). The noise from the predetermined noise source is, for example, a vibration sound generated by driving the motor such as the USM or the STM. For example, the motor is driven in an AF process for focusing on the object. The imaging apparatus 100 acquires noise such as a driving sound generated within the housing of the imaging apparatus 100 and within the housing of the optical lens 300, using the noise microphone 201*c*. The imaging apparatus 100 generates noise parameters using sound data of the acquired noise. The L-microphone 201*a*, the R-microphone 201*b*, and the noise microphone 201*c* are non-directional microphones. An example of the placement of the L-microphone 201*a*, the R-microphone 201*b*, and the noise microphone 201*c* will be described below with reference to FIG. 4.

Each of the L-microphone 201*a*, the R-microphone 201*b*, and the noise microphone 201*c* generates an analog sound signal from the acquired sound and inputs the analog sound signal to an A/D conversion unit 202. The sound signal input from the L-microphone 201*a* is represented as "Lch", the sound signal input from the R-microphone 201*b* is represented as "Rch", and the sound signal input from the noise microphone 201*c* is represented as "Nch".

The A/D conversion unit 202 converts the analog sound signal input from each of the L-microphone 201*a*, the R-microphone 201*b*, and the noise microphone 201*c* into a digital sound signal. The A/D conversion unit 202 outputs the converted digital sound signal to a fast Fourier transform (FFT) unit 203. The A/D conversion unit 202 executes a sampling process at a sampling frequency of 48 kHz and a bit depth of 16 bits, thereby converting the analog sound signals into the digital sound signals.

The FFT unit 203 performs a fast Fourier transform process on the digital sound signal in the time domain input from the A/D conversion unit 202, thereby converting the digital sound signal in the time domain into a digital sound signal in the frequency domain. The digital sound signal in the frequency domain has a frequency spectrum of 1024 points in a frequency range from 0 Hz to 48 kHz. The digital sound signal in the frequency domain has a frequency spectrum of 513 points in a frequency range from 0 Hz to 24 kHz, which is the Nyquist frequency. The imaging apparatus 100 performs a noise reduction process using a frequency spectrum of 513 points from 0 Hz to 24 kHz in sound data output from the FFT unit 203.

The frequency spectrum of the sound signal Lch obtained by the fast Fourier transform is represented by pieces of sequence data at 513 points, i.e., Lch_Before[0] to Lch_Before[512]. These pieces of sequence data are collectively referred to as "Lch_Before". The frequency spectrum of the sound signal Rch obtained by the fast Fourier transform is represented by pieces of sequence data at 513 points, i.e., Rch_Before[0] to Rch_Before[512]. These pieces of sequence data are collectively referred to as "Rch_Before". Each of Lch_Before and Rch_Before is an example of first frequency spectrum data.

The frequency spectrum of the sound signal Nch obtained by the fast Fourier transform is represented by pieces of sequence data at 513 points, i.e., Nch_Before[0] to Nch_Before[512]. These pieces of sequence data are collectively referred to as "Nch_Before". Nch_Before is an example of second frequency spectrum data.

A switching unit 204 switches paths based on control information from the lens control unit 102. If the optical lens 300 is being driven, the switching unit 204 switches paths so that a subtraction processing unit A 207 performs a noise reduction process. If the optical lens 300 is not being driven, the switching unit 204 switches paths so that the subtraction processing unit A 207 does not perform the noise reduction process.

Based on Nch_Before, a noise data generation unit A 205 generates data for reducing lens driving noise included in Lch_Before and Rch_Before. The noise data generation unit A 205 generates pieces of sequence data NLA[0] to NLA[512] for reducing noise included in the pieces of sequence data Lch_Before[0] to Lch_Before[512], respectively, using noise parameters. The noise data generation unit A 205 also generates pieces of sequence data NRA[0] to NRA[512] for reducing noise included in the pieces of sequence data Rch_Before[0] to Rch_Before[512], respectively.

The frequency points in the pieces of sequence data NLA[0] to NLA[512] are the same as the frequency points in the pieces of sequence data Lch_Before[0] to Lch_Before[512]. The frequency points in the pieces of sequence data NRA[0] to NRA[512] are the same as the frequency points in the pieces of sequence data Rch_Before[0] to Rch_Before [512].

The pieces of sequence data NLA[0] to NLA[512] are collectively referred to as "NLA". The pieces of sequence data NRA[0] to NRA[512] are collectively referred to as "NRA". Each of NLA and NRA is an example of third frequency spectrum data.

In a noise parameter recording unit 206, noise parameters for the noise data generation unit A 205 to generate NLA and NRA from Nch_Before are recorded. In the noise parameter recording unit 206, noise parameters regarding lens driving for the types of lenses, which are noise parameters used by the noise data generation unit A 205, are recorded. While sound data is being recorded, the noise data generation unit A 205 does not switch noise parameters.

In the noise parameter recording unit 206, noise parameters for a noise data generation unit B 208 (described below) to generate NLB and NRB from Nch_Before are also recorded.

The noise parameters for generating NLA from Nch_Before are collectively referred to as "PLxA". The noise parameters for generating NRA from Nch_Before are collectively referred to as "PRxA".

PLxA and PRxA have the same numbers of pieces of sequence data as those of NLA and NRA, respectively. For example, PL1A is pieces of sequence data PL1A[0] to PL1A[512]. The frequency points in PL1A are the same as the frequency points in Lch_Before. For example, PR1A is pieces of sequence data PR1A[0] to PR1A[512]. The frequency points in PR1A are the same as the frequency points in Rch_Before. The noise parameters will be described below with reference to FIG. 10.

In the noise parameter recording unit 206, coefficients for 513 points of a frequency spectrum are all recorded as the noise parameters. In the noise parameter recording unit 206, however, instead of coefficients for all the frequencies at 513 points, at least coefficients for frequency points required to reduce noise may be recorded. For example, in the noise parameter recording unit 206, coefficients for respective frequencies in a frequency spectrum from 20 Hz to 20 kHz, which are considered as typical audible frequencies, may be recorded as the noise parameters, and coefficients for other frequency spectra may not be recorded. For example, coefficients for a frequency spectrum in which the values of coefficients are zero may not be recorded as the noise parameters in the noise parameter recording unit 206.

The subtraction processing unit A 207 subtracts NLA and NRA from Lch_Before and Rch_Before, respectively. In the present exemplary embodiment, the subtraction processing unit A 207 reduces noise at a high level, regardless of whether short-term noise or long-term noise.

The subtraction processing unit A 207 includes an L-subtractor A 207*a* that subtracts NLA from Lch_Before, and an R-subtractor A 207*b* that subtracts NRA from Rch_Before. The L-subtractor A 207*a* subtracts NLA from Lch_Before and outputs pieces of sequence data at 513 points, i.e., Lch_A_After[0] to Lch_A_After[512]. The R-subtractor A 207*b* subtracts NRA from Rch_Before and outputs pieces of sequence data at 513 points, i.e., Rch_A_After[0] to Rch_A_After[512]. The subtraction processing unit A 207 executes the subtraction process using a spectral subtraction method.

Based on Nch_Before, the noise data generation unit B 208 generates data for reducing noise included in Lch_A_After and Rch_A_After.

The noise data generation unit B 208 generates pieces of sequence data NLB[0] to NLB[512] for reducing noise included in the pieces of sequence data Lch_A_After[0] to Lch_A_After[512], respectively, using noise parameters. The noise data generation unit B 208 also generates pieces of sequence data NRB[0] to NRB[512] for reducing noise included in the pieces of sequence data Rch_A_After[0] to Rch_A_After[512], respectively, using noise parameters.

The frequency points in the pieces of sequence data NLB[0] to NLB[512] are the same as the frequency points in the pieces of sequence data Lch_A_After[0] to Lch_A_After[512]. The frequency points in the pieces of sequence data NRB[0] to NRB[512] are the same as the frequency points in the pieces of sequence data Rch_A_After[0] to Rch_A_After[512].

The pieces of sequence data NLB[0] to NLB[512] are collectively referred to as "NLB". The pieces of sequence data NRB[0] to NRB[512] are collectively referred to as "NRB". Each of NLB and NRB is an example of fourth frequency spectrum data.

In the noise parameter recording unit 206, a plurality of types of noise parameters according to the types of noise, which is noise parameters used by the noise data generation unit B 208, is recorded.

The noise parameters for generating NLB from Nch_Before are collectively referred to as "PLxB". The noise parameters for generating NRB from Nch_Before are collectively referred to as "PRxB".

PLxB and PRxB have the same numbers of pieces of sequence data as those of NLB and NRB, respectively. For example, PLB is pieces of sequence data PL1B[0] to PL1B [512]. The frequency points in PLB are the same as the frequency points in Lch_Before. For example, PR1B is pieces of sequence data PR1B[0] to PR1B[512]. The frequency points in PR1B are the same as the frequency points in Rch_Before. The noise parameters will be described below with reference to FIG. 10.

In the noise parameter recording unit 206, coefficients for 513 points of a frequency spectrum are all recorded as the noise parameters. In the noise parameter recording unit 206, however, instead of coefficients for all the frequencies at 513 points, at least coefficients for frequency points required to reduce noise may be recorded. For example, in the noise parameter recording unit 206, coefficients for respective frequencies in a frequency spectrum from 20 Hz to 20 kHz, which are considered as typical audible frequencies, may be recorded as the noise parameters, and coefficients for other frequency spectra may not be recorded. For example, coefficients for a frequency spectrum in which the values of coefficients are zero may not be recorded as the noise parameters in the noise parameter recording unit 206.

A subtraction processing unit B 209 subtracts NLB and NRB from Lch_A_After and Rch_A_After, respectively. For example, the subtraction processing unit B 209 includes an L-subtractor B 209*a* that subtracts NLB from Lch_A_After, and an R-subtractor B 209*b* that subtracts NRB from Rch_A_After. The L-subtractor B 209*a* subtracts NLB from Lch_A_After and outputs pieces of sequence data at 513 points, i.e., Lch_After[0] to Lch_After[512]. The R-subtractor B 209*b* subtracts NRA from Rch_A_After and outputs pieces of sequence data at 513 points, i.e., Rch_After[0] to Rch_After[512]. The subtraction processing unit B 209 executes the subtraction process using the spectral subtraction method.

The subtraction processing unit B 209 subtracts noise data corresponding to noise that is constantly generated other than the noise generated by lens driving. The noise that is constantly generated is, for example, the floor noise or the electrical noise of a microphone. Although the noise data generation unit B 208 generates NLB and NRB based on Nch_Before, another method may be used. For example, NLB and NRB may be recorded in the noise parameter recording unit 206, and the subtraction processing unit B 209 may directly read NLB and NRB from the noise parameter recording unit 206 not via the noise data generation unit B 208. This is because the floor noise or the electrical noise of a microphone is constantly generated, and therefore, it is less necessary to reference noise included in Nch_Before.

A short-term noise detection unit 210 detects short-term noise from Nch_Before. Short-term noise is, for example, short-term noise generated by the meshing of gears in the optical lens 300. On the other hand, long-term noise is, for example, a sliding contact sound within the housing of the optical lens 300. Alternatively, the short-term noise detection unit 210 may detect short-term noise from Lch_Before or Rch_Before.

A short-term noise subtraction processing unit 211 performs a noise reduction process for reducing particularly short-term noise on a sound signal input from the subtraction processing unit A 207. While the lens is being driven, the subtraction processing unit A 207 and the short-term noise subtraction processing unit 211 perform the noise reduction process before processing is performed by the subtraction processing unit B 209.

A data buffer 212 is a buffer (a memory) that temporarily stores data used by the short-term noise subtraction processing unit 211.

The details of the processing of the short-term noise detection unit 210, the short-term noise subtraction processing unit 211, and the data buffer 212 will be described below.

An inverse fast Fourier transform (iFFT) unit 213 performs inverse fast Fourier transform (inverse Fourier transform) on a digital sound signal in the frequency domain input from the subtraction processing unit B 209, thereby converting the digital sound signal in the frequency domain into a digital sound signal in the time domain.

A sound processing unit 214 executes sound processing, such as an equalizer process, an auto level controller process, and an enhancement process for enhancing a stereo feeling, on the digital sound signal in the time domain. The sound processing unit 214 outputs sound data obtained by performing the sound processing to the volatile memory 105.

Although the imaging apparatus 100 includes two microphones as the first microphone, the first microphone may be a single microphone or three or more microphones. For example, in a case where the sound input unit 104 includes a single microphone as the first microphone, sound data acquired by the single microphone is recorded using a monaural method. For example, in a case where the sound input unit 104 includes three or more microphones as the first microphone, pieces of sound data acquired by the three or more microphones are recorded using a surround method.

Although the L-microphone 201*a*, the R-microphone 201*b*, and the noise microphone 201*c* are non-directional microphones in the present exemplary embodiment, these microphones may be directional microphones.

Although the subtraction processing unit B 209 reduces constant noise, another method may be used. For example, in a case where the subtraction processing unit A 207 also has the function of the subtraction processing unit B 209, the subtraction processing unit B 209 may not perform a noise reduction process.

Placement of Microphones of Audio Input Unit 104

Figure 4:
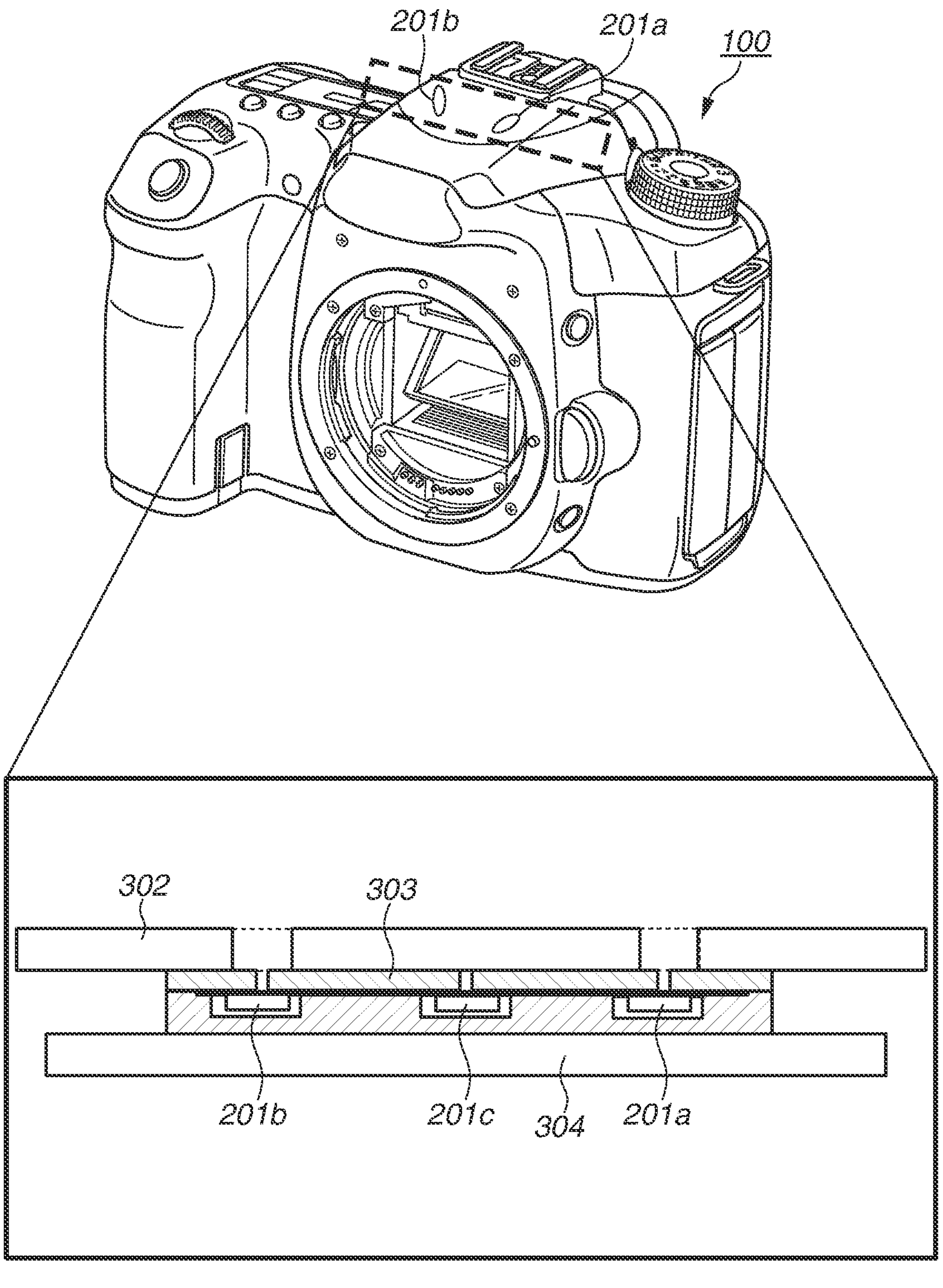
FIG. 4 is a diagram illustrating placement of microphones in the sound input unit of the imaging apparatus according to one or more aspects of the present disclosure.

An example of the placement of the microphones in the sound input unit 104 according to the present exemplary embodiment is described. FIG. 4 illustrates an example of the placement of the L-microphone 201*a*, the R-microphone 201*b*, and the noise microphone 201*c*.

FIG. 4 is an example of a cross-sectional view of a portion of the imaging apparatus 100 to which the L-microphone 201*a*, the R-microphone 201*b*, and the noise microphone 201*c* are attached. This portion of the imaging apparatus 100 includes an exterior portion 302, a microphone bush 303, and a fixing portion 304.

The exterior portion 302 has holes through which an environmental sound is input to the microphones (hereinafter referred to as "microphone holes"). The microphone holes are formed above the L-microphone 201*a* and the R-microphone 201*b*. On the other hand, the noise microphone 201*c* is provided to acquire a driving sound generated within the housing of the imaging apparatus 100 and within the housing of the optical lens 300, and does not need to acquire the environmental sound. Thus, in the exterior portion 302, a microphone hole is not formed above the noise microphone 201*c*.

The driving sound generated within the housing of the imaging apparatus 100 and within the housing of the optical lens 300 is acquired by the L-microphone 201*a* and the R-microphone 201*b* through the microphone holes. In a case where the driving sound is generated within the housing of the imaging apparatus 100 and within the housing of the optical lens 300 in the state where the environmental sound is small, a sound to be acquired by each microphone is mainly this driving sound. Thus, the level of the sound from the noise microphone 201*c* is higher than the levels of the sounds from the L-microphone 201*a* and the R-microphone 201*b*. That is, in this case, the relationships between the levels of sound signals output from the microphones are as follows.

$$Lch \approx Rch < Nch$$

If the environmental sound becomes large, the levels of the sounds from the L-microphone 201*a* and the R-microphone 201*b* based on the environmental sound are higher than the level of the sound from the noise microphone 201*c* based on the driving sound generated in the imaging apparatus 100 or the optical lens 300. Thus, in this case, the relationships between the levels of the sound signals output from the microphones are as follows.

$$Lch \approx Rch > Nch$$

The shape of each microphone hole formed in the exterior portion 302 is an ellipse in the present exemplary embodiment, but may be another shape such as a circle or a square. The shape of the microphone hole above the microphone 201*a* and the shape of the microphone hole above the microphone 201*b* may be different from each other.

The noise microphone 201*c* is placed in proximity to the L-microphone 201*a* and the R-microphone 201*b*. The noise microphone 201*c* is placed between the L-microphone 201*a* and the R-microphone 20*l* b. Consequently, the sound signal generated by the noise microphone 201*c* from the driving sound generated within the housing of the imaging apparatus 100 and within the housing of the optical lens 300 is a signal similar to the sound signals generated by the L-microphone 201*a* and the R-microphone 201*b* from this driving sound.

The microphone bush 303 is a member to which the L-microphone 201*a*, the R-microphone 201*b*, and the noise microphone 201*c* are fixed. The fixing portion 304 is a member that fixes the microphone bush 303 to the exterior portion 302.

The exterior portion 302 and the fixing portion 304 are formed of mold members made of a polycarbonate (PC) material. Alternatively, the exterior portion 302 and the fixing portion 304 may be formed of metal members made of aluminum or stainless steel. The microphone bush 303 is formed of a rubber material such as ethylene propylene diene rubber.

Processing Method of FFT Unit 203

Figures 5A, 5B:
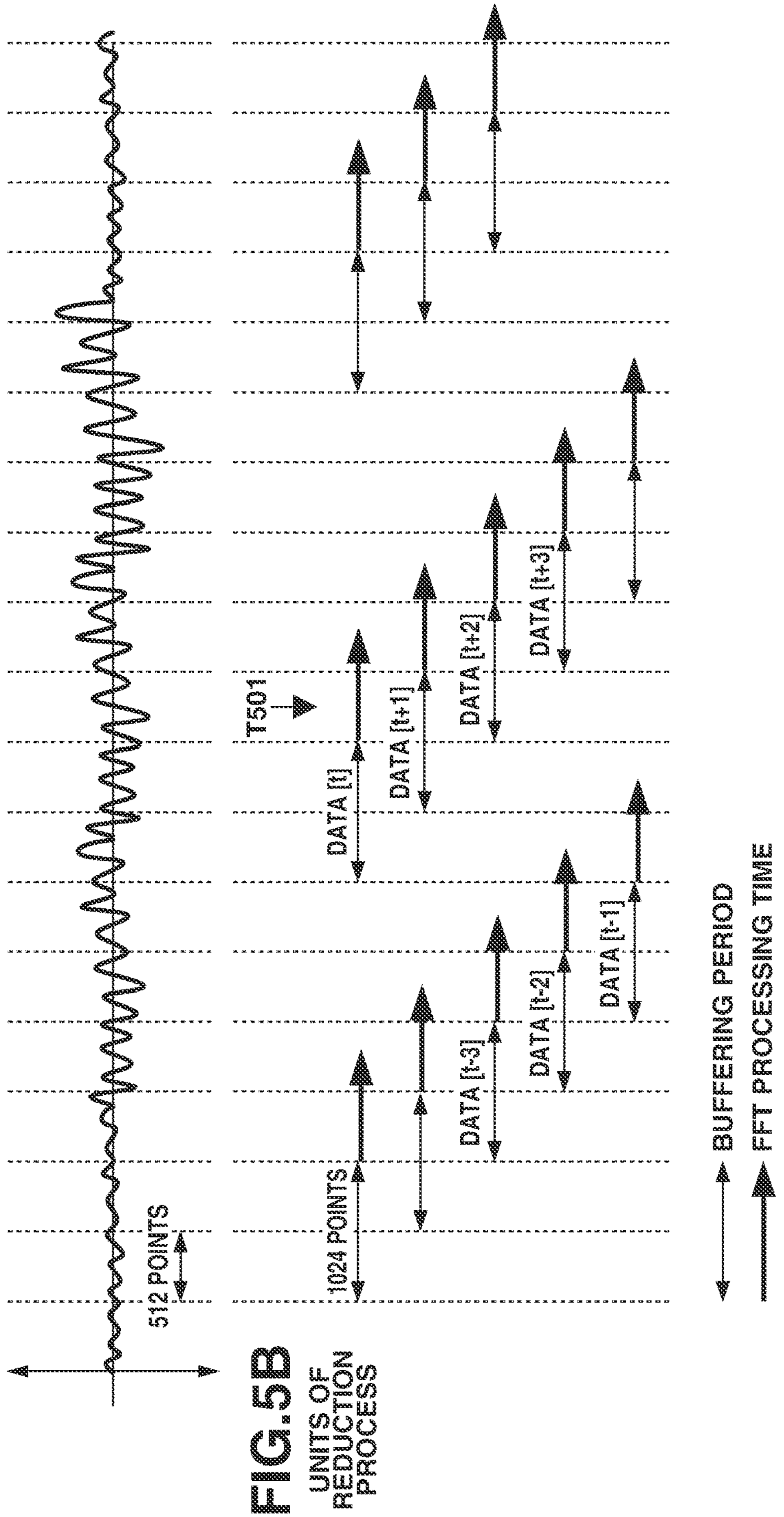
FIGS. 5A and 5B are a timing chart illustrating units of sound processing according to one or more aspects of the present disclosure.

With reference to FIGS. 5A and 5B, processing performed by the FFT unit 203 is described. In FIGS. 5A and 5B, the horizontal direction represents time.

FIG. 5A illustrates an example of a sound signal in the time domain. The sound signal is a signal with a sampling frequency of 48 kHz and a bit depth of 24 bits.

FIG. 5B illustrates examples of the units of the data length of the sound signal processed by the FFT unit 203. In the present exemplary embodiment, the sound signal is subjected to FFT in 1024-sample units. In the present exemplary embodiment, a sound signal with 1024 samples is one frame. After buffering a sound signal corresponding to one frame, the FFT unit 203 performs the FFT.

The sound input unit 104 performs a noise reduction process using an overlap-add method. For example, the sound input unit 104 performs the noise reduction process such that sound signals each corresponding to one frame by 512 samples (a half frame).

The manner of representing each frame is described. For example, in FIG. 5B, a sound signal of one frame generated by the FFT process at a time T501 is "frame data [t]". In this case, a sound signal of a frame generated one frame before (immediately before) the frame data [t] is represented as "frame data [t−1]", and a sound signal of a frame generated one frame after (immediately after) the frame data [t] is represented as "frame data [t+1]". As described above, based on a sound signal of a frame subjected to the FFT process at a certain time, pieces of frame data are represented. In frame data, sound signals Lch, Rch, and Nch are included, and a frequency spectrum is stored as sequence data with respect to each channel. For example, in a case where a channel and a frequency spectrum are specifically represented, in the above example, at the time T501, a sound signal Lch corresponding to an n-th piece of sequence data in its frequency spectrum is represented as "frame data L[t][n]".

Short-Term Noise Reduction Process

With reference to FIGS. 6A to 6D, a short-term noise reduction process performed by the short-term noise detection unit 210 and the short-term noise subtraction processing unit 211 is described. Processing in FIGS. 6A to 6D is achieved by the CPU of the control unit 111 controlling the components.

Figure 6A:
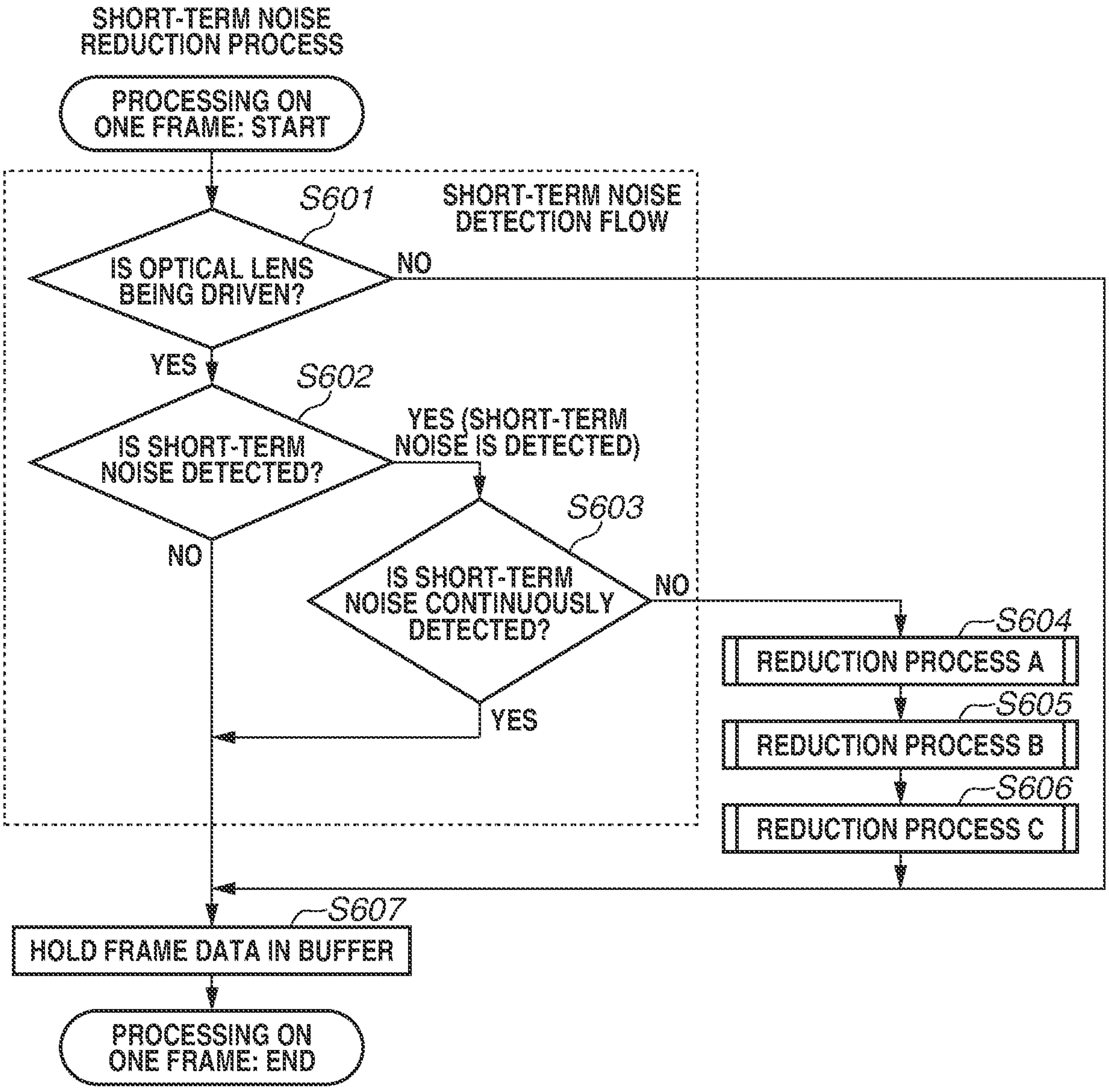
FIGS. 6A to 6D are flowcharts illustrating processing content of a short-term noise processing unit according to one or more aspects of the present disclosure.

FIG. 6A is a flowchart illustrating an example of the short-term noise reduction process. Processing on frame data of one frame is described.

In step S601, it is determined whether the optical lens 300 is being driven. For example, based on control information input from the lens control unit 102, the switching unit 204 determines whether the optical lens 300 is being driven. If it is determined that the optical lens 300 is being driven (YES in step S601), the switching unit 204 switches paths so that Lch_Before and Rch_Before are input to the subtraction processing unit A 207. If it is determined that the optical lens 300 is not being driven (NO in step S601), the switching unit 204 switches paths so that Lch_Before and Rch_Before are input to the subtraction processing unit B 209.

In step S602, the short-term noise detection unit 210 determines whether short-term noise is included in frame data of one frame. The short-term noise detection unit 210 calculates a magnitude N[t]_Power of a sound in one frame from pieces of frame data N[t][0] to [512]. If the value of N[t]_Power is less than a predetermined threshold (NO in step S602), the processing proceeds to step S607. If, on the other hand, N[t]_Power is greater than or equal to the predetermined threshold (YES in step S602), the processing proceeds to step S603.

The short-term noise detection unit 210 may calculate N[t]_Power by weighting N[t]_Power with respect to each particular frequency range or each frequency. The short-term noise detection unit 210 calculates N[t]_Power from the frequency spectrum, but may calculate N[t]_Power from the amplitude value of the sound signal in the time domain.

In step S603, the short-term noise detection unit 210 determines whether the short-term noise is continuously detected. That is, the short-term noise detection unit 210 determines whether the short-term noise is included in a predetermined number or more of consecutive frames. For example, the short-term noise detection unit 210 determines whether the short-term noise is detected five times in a row. If the short-term noise is detected the predetermined number of times or more in a row, this noise is no longer short-term noise and is considered as long-term noise. If the short-term noise is not detected the predetermined number of times or more in a row (NO in step S603), the processing proceeds to step S604. If the short-term noise is detected the predetermined number of times or more in a row (YES in step S603), the processing proceeds to step S607.

The reason for using Nch_Before to detect short-term noise is as follows. As described above, noise acquired by the noise microphone 201*c* is greater than noise acquired by the L-microphone 201*a* and the R-microphone 201*b*. Additionally, microphone holes are formed above the L-microphone 201*a* and the R-microphone 201*b*, and a microphone hole is not formed above the noise microphone 201*c*. That is, an environmental sound acquired by the noise microphone 201*c* is smaller than the environmental sound acquired by the L-microphone 201*a* and the R-microphone 201*b*. In other words, the environmental sound included in a signal generated from a sound acquired by the noise microphone 201*c* is smaller than the environmental sound included in signals generated from sounds acquired by the L-microphone 201*a* and the R-microphone 201*b*. Moreover, noise included in the signal generated from the sound acquired by the noise microphone 201*c* is greater than noise included in the signals generated from the sounds acquired by the L-microphone 201*a* and the R-microphone 201*b*. Thus, it can be said that Nch_Before is a sound signal more suitable for detecting noise than Lch_Before and Rch_Before arc.

The details of this short-term noise detection process will be described below with reference to FIGS. 7A and 7B.

In steps S604 to S606, the short-term noise subtraction processing unit 211 performs a process for reducing the short-term noise. In step S604, the short-term noise subtraction processing unit 211 executes a reduction process A. In step S605, the short-term noise subtraction processing unit 211 executes a reduction process B. In step S606, the short-term noise subtraction processing unit 211 executes a reduction process C. The details of each reduction process will be described below. Although three reduction processes, i.e., the reduction processes A to C, are executed, only any of the reduction processes A to C may be executed. The order of execution of the reduction processes A to C is not limited to this order, and may be another order.

In step S607, the short-term noise subtraction processing unit 211 holds (records) frame data L[t] and frame data R[t] in the data buffer 212 upon the completion of the processing on the frame data. The short-term noise subtraction processing unit 211 hereinafter treats the frame data L[t] and the frame data R[t] as frame data L[t−1] and frame data R[t−1], respectively.

This is the description of the short-term noise reduction process. The reduction processes A to C are described below.

Figure 6B:
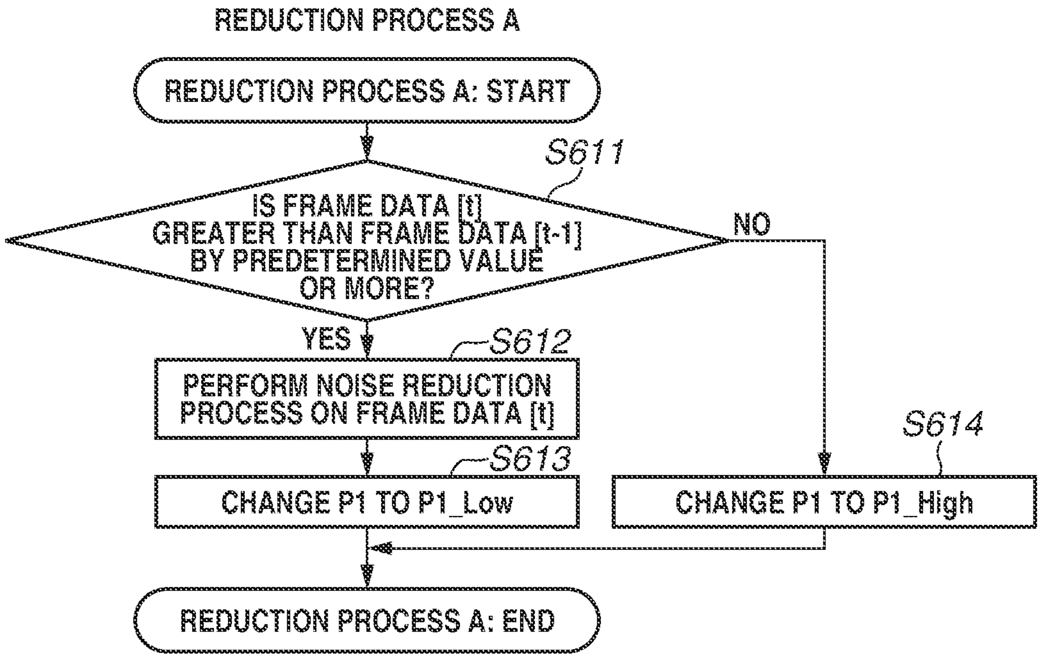

First, the processing of the reduction process A is described. FIG. 6B is a flowchart illustrating an example of the reduction process A.

In step S611, the short-term noise subtraction processing unit 211 determines whether the frame data [t] is greater than the frame data [t−1] by a predetermined value or more. For example, the short-term noise subtraction processing unit 211 determines whether the value of frame data L[t][n] is greater than the value of frame data L[t−1][n−1] by a threshold P1 (e.g., 6 dB) or more. If it is determined that the frame data [t] is greater than the frame data [t−1] by the predetermined value or more (YES in step S611), the processing proceeds to step S612. If it is determined that the frame data [t] is not greater than the frame data [t−1] by the predetermined value or more (NO in step S611), the processing proceeds to step S614. Alternatively, using the frame data R[t], the short-term noise subtraction processing unit 211 may determine whether the frame data R[t] is greater than the frame data R[t−1] by the predetermined value or more.

In step S612, the short-term noise subtraction processing unit 211 executes a noise reduction process on the frame data [t]. For example, as expressed in the formula (1) below, the short-term noise subtraction processing unit 211 changes the value of the frame data L[t][n] to a value obtained by adding the threshold P1 to frame data L[t−1][n]. That is, since the value of the frame data L[t][n] before the change is greater than or equal to the frame data L[t−1][n], the value of the frame data L[t][n] is changed to be smaller than the value before the change.

$$L[t][n] \leftarrow L[t-1][n]+P1 \quad (1)$$

In step S613, the short-term noise subtraction processing unit 211 changes the value of the threshold P1 to a value P1_Low, which is a value smaller than the threshold P1. For example, if the initial value of the threshold P1 is 6 dB, the short-term noise subtraction processing unit 211 sets the value P1_Low to 3 dB and changes the threshold P1 to 3 dB. That is, in the present exemplary embodiment, in this case, the threshold P1 is changed from 6 dB to 3 dB.

In step S614, the short-term noise subtraction processing unit 211 changes the threshold P1 to a value P1_High, which is a value greater than the threshold P1. In the present exemplary embodiment, the value P1_High is a value greater than the value P1_Low. In the present exemplary embodiment, the value P1_High is the same value as the threshold P1. That is, if the threshold P1 is the initial value in the process of step S612, the threshold P1 is not changed. If, on the other hand, the threshold P1 is changed to the value P1_Low in the process of step S612, the threshold P1 returns to the initial value by the process of this step.

This is the description of the processing of the reduction process A. A timing chart for the processing in this flowchart will be described below with reference to FIGS. 8A to 8D.

The processing in FIGS. 6A and 6B is also similarly executed on the frame data R[t].

Figure 6D:
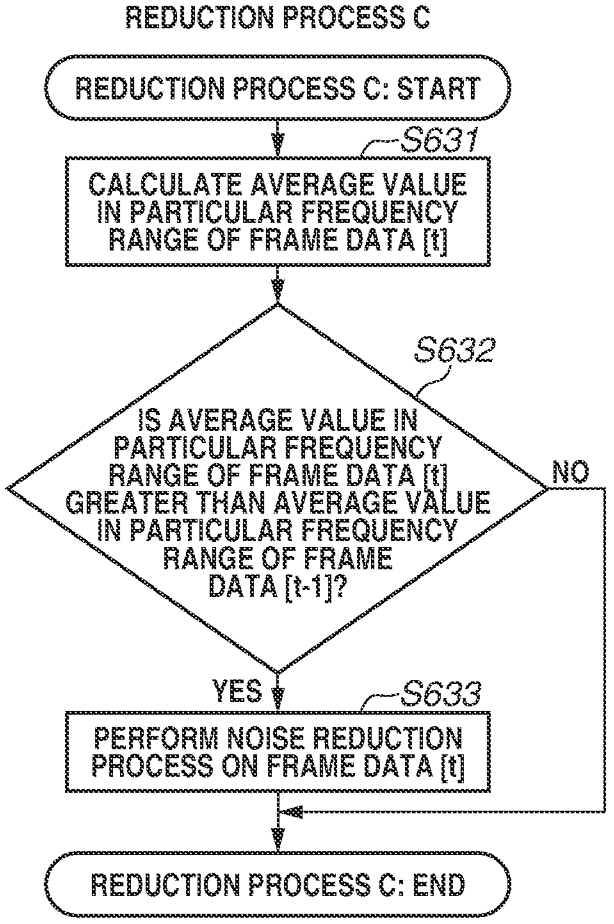
Figure 6C:
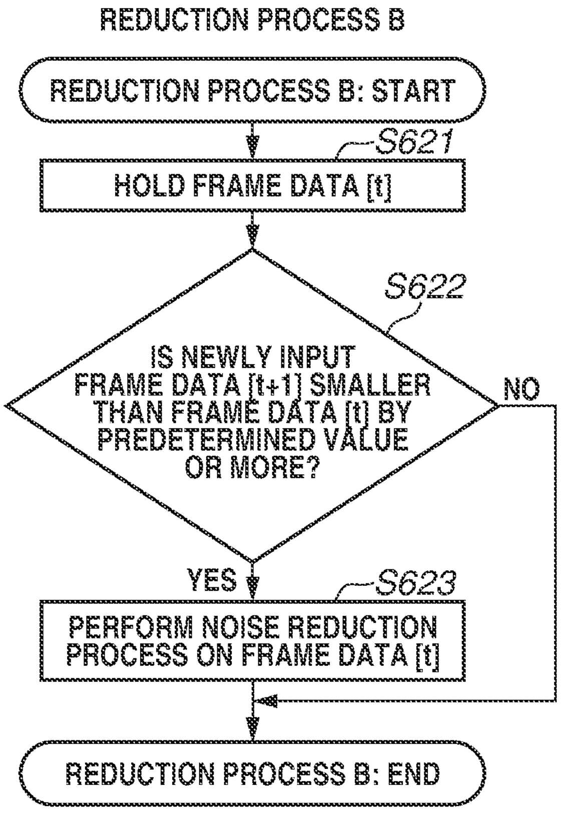

Next, the processing of the reduction process B is described. FIG. 6C is a flowchart illustrating an example of the reduction process B.

In step S621, the short-term noise subtraction processing unit 211 holds the frame data [t]. For example, the short-term noise subtraction processing unit 211 holds the frame data L[t] and the frame data R[t] in the data buffer 212.

In step S622, the short-term noise subtraction processing unit 211 determines whether newly input frame data [t+1] is smaller than the frame data [t] by a predetermined value or more. For example, the short-term noise subtraction processing unit 211 determines whether the value of the frame data L[t][n] is greater than the value of frame data L[t+1][n+1] by a threshold P2 (e.g., 3 dB) or more. Alternatively, using the frame data R[t], the short-term noise subtraction processing unit 211 may determine whether the frame data R[t] is greater than frame data R[t+1] by the predetermined value or more. If it is determined that the frame data [t+1] is smaller than the frame data [t] by the predetermined value or more (YES in step S622), the processing proceeds to step S623. If it is determined that the frame data [t+1] is not smaller than the frame data [t] by the predetermined value or more (NO in step S622), the processing in this flowchart ends.

In step S623, the short-term noise subtraction processing unit 211 executes a noise reduction process on the frame data [t]. For example, as expressed in the formula (2) below, the short-term noise subtraction processing unit 211 calculates the value of the frame data L[t][n] to be the frame data L[t−1][n].

$$L[t][n] \leftarrow L[t-1][n] \quad (2)$$

This is the description of the processing of the reduction process B. A timing chart for the processing in this flowchart will be described below with reference to FIGS. 8A to 8D.

The processing in FIG. 6C is also similarly executed on the frame data R[t].

As described above, in a case where the short-term noise subtraction processing unit 211 reduces short-term noise, the short-term noise subtraction processing unit 211 reduces noise by switching a plurality of thresholds.

Next, the processing of the reduction process C is described. FIG. 6D is a flowchart illustrating an example of the reduction process C.

In step S631, the short-term noise subtraction processing unit 211 calculates an average value in a particular frequency range of the frame data [t]. The particular frequency range is a frequency range where noise is likely to be audibly perceived and noise is likely to be generated. In the present exemplary embodiment, the particular frequency range is from 1 kHz to 4 kHz. The average value in the particular frequency range of the frame data L[t] is represented as "L_ave[t]".

In step S632, the short-term noise subtraction processing unit 211 determines whether the average value in the particular frequency range of the frame data [t] is greater than the average value in the particular frequency range of the frame data [t−1]. For example, the short-term noise subtraction processing unit 211 determines whether L_ave[t] is greater than L_ave[t−1]. If it is determined that the average value L_ave[t] in the particular frequency range of the frame data [t] is greater than the average value L_ave[t−1] in the particular frequency range of the frame data [t−1] (YES in step S632), the processing proceeds to step S633. If it is determined that the average value L_ave[t] in the particular frequency range of the frame data [t] is not greater than the average value L_ave[t−1] in the particular frequency range of the frame data [t−1](NO in step S632), the processing in this flowchart ends.

In step S633, the short-term noise subtraction processing unit 211 performs a noise reduction process to bring the average value L_ave[t] in the particular frequency range of the frame data [t] close to the average value L_ave[t−1] in the particular frequency range of the frame data [t−1]. For example, in the present exemplary embodiment, as expressed in the formula (3) below, the short-term noise subtraction processing unit 211 calculates the value of the frame data L[t][n] to bring L_ave[t] close to L_ave[t−1].

$$L[t][n] \leftarrow L[t][n]-(L\_ave[t]-L\_ave[t-1]) \quad (3)$$

This is the description of the processing of the reduction process C. A timing chart for the processing in this flowchart will be described below with reference to FIGS. 9A and 9B.

The processing in FIG. 6D is also similarly executed on the frame data R[t]. Timing Chart for Short-term noise detection Unit 210

Figures 7A, 7B:
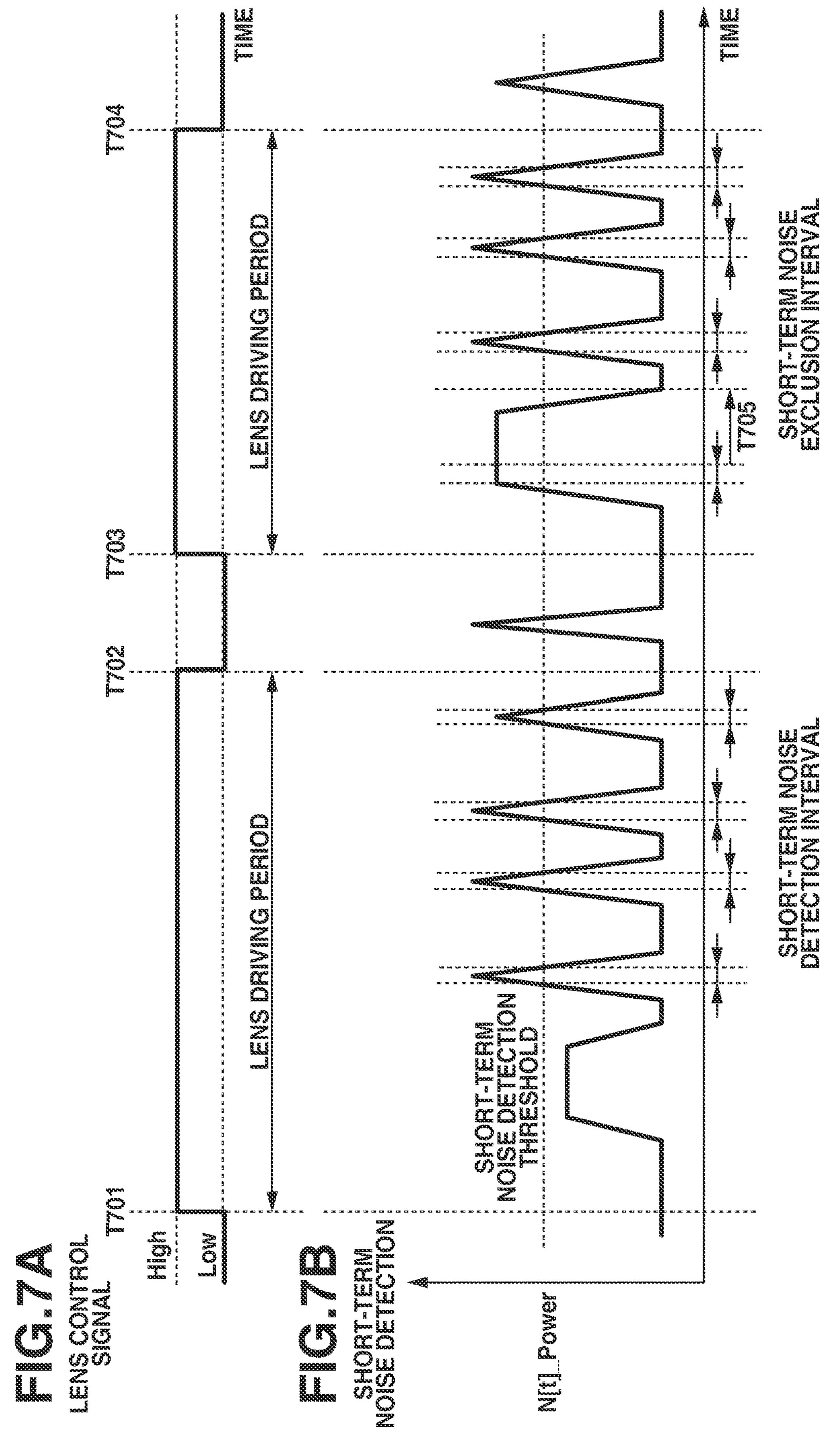
FIGS. 7A and 7B are a timing chart illustrating a short-term noise detection method performed by the short-term noise processing unit according to one or more aspects of the present disclosure.

With reference to a timing chart in FIGS. 7A and 7B, the short-term noise detection process performed by the short-term noise detection unit 210 is described.

FIG. 7A illustrates an example of a lens control signal. The lens control signal is a signal with which the lens control unit 102 gives an instruction to drive the optical lens 300. The level of the lens control signal is represented by two values, i.e., high and low. If the level of the lens control signal is high, the lens control unit 102 gives an instruction to drive the optical lens 300. If the level of the lens control signal is low, the lens control unit 102 does not give an instruction to drive the optical lens 300.

FIG. 7B is a graph illustrating an example of N[t]_Power. The vertical axis represents the value of N[t]_Power. The horizontal axis represents time. If short-term noise is generated, the value of N[t]_Power increases. If the optical lens 300 is being driven and N[t]_Power is greater than or equal to a predetermined value, the short-term noise detection unit 210 detects that short-term noise is generated. For example, from a time T701 to a time T702 and from a time T703 to a time T704, if N[t]_Power is greater than a short-term noise detection threshold, it is determined that short-term noise is generated. If, however, N[t]_Power is greater than or equal to the predetermined value for a certain period as in an interval T705, the short-term noise detection unit 210 treats this interval as a period when short-term noise is not generated.

Timing Chart for Short-Term Noise Reduction

First, with reference to a timing chart in FIGS. 8A to 8D, the reduction processes A and B are described. The reduction process C is described with reference to FIGS. 9A and 9B thereafter.

FIG. 8A is an example of a lens control signal. FIG. 8B is a graph illustrating an example of N[t]_Power. FIGS. 8A and 8B are similar to the graphs in the period from the time T701 to the time T702 in FIGS. 7A and 7B, respectively.

FIG. 8C is a diagram illustrating an example of a frequency spectrum subjected to the reduction process A. In the present exemplary embodiment, the frequency spectrum of frame data L[t][n] is described. The vertical axis represents the value of the power of the frequency spectrum. Similar processing is also performed on frame data L[t] and frame data R[t] at other frequencies.

A plain portion 811 (including a shaded portion and a hatched portion) indicates a frequency spectrum input to the short-term noise subtraction processing unit 211 (a frequency spectrum before being subjected to the reduction process A). A shaded portion 812 indicates a frequency spectrum generated by the short-term noise subtraction processing unit 211 performing the reduction process A.

The vertical axis represents the frame data L[t][n] with respect to each time t at a characteristic frequency N.

First, in an interval T801, the level of the frequency spectrum at a time t when short-term noise is detected is greater than the level of the frequency spectrum at a time t−1 by a threshold P1 (=P1_High) or more. Thus, in the reduction process A, as expressed in the formula (4) below, the level of the frequency spectrum at the time t is attenuated to a frequency spectrum greater than the level of the frequency spectrum at the time t−1 by the threshold P1 (=P1_High). A shaded portion 812 (including a hatched portion) indicates a frequency spectrum reduced by the reduction process A. By the execution of the reduction process A at the time t, the value of the threshold P1 is changed to P1_Low.

$$L[t][n] \rightarrow L[t-1][n]+P1\_\mathrm{High} \quad (4)$$

The level of the frequency spectrum at a time t+1 is greater than the level of the frequency spectrum at the time t by the threshold P1 (=P1_Low) or more. Thus, in the reduction process A, as expressed in the formula (5) below, the level of the frequency spectrum at the time t+1 is attenuated to a frequency spectrum greater than the level of the frequency spectrum at the time t by the threshold P1 (=P1_Low).

$$L[t][n] \leftarrow L[t-1][n]+P1\_Low \quad (5)$$

The above processing is also similarly executed in intervals T802 and T804.

Next, in an interval T803, the level of the frequency spectrum at a time t when short-term noise is detected is not greater than the level of the frequency spectrum at a time t−1 by the threshold P1 (=P1_High) or more. Thus, the reduction process A is not executed on the frequency spectrum at the time t. Since the reduction process A is not executed, the value of the threshold P1 is not changed.

The level of the frequency spectrum at a time t+1 is greater than the level of the frequency spectrum at the time t by the threshold P1 (=P1_High) or more. Thus, in the reduction process A, as expressed in the formula (6) below, the level of the frequency spectrum at the time t+1 is attenuated to a frequency spectrum greater than the level of the frequency spectrum at the time t by the threshold P1 (=P_High).

$$L[t][n] \leftarrow L[t-1][n]+P1\_\mathrm{High} \quad (6)$$

FIG. 8D is a diagram illustrating an example of a frequency spectrum subjected to the reduction process B.

A hatched portion 813 indicates a frequency spectrum generated by performing the reduction process B.

First, in the interval T801, the level of the frequency spectrum at a time t+1 is not smaller than the frequency spectrum at a time t when short-term noise is detected, by a threshold P2 or more. Thus, the reduction process B is not executed on the frequency spectrum at the time t.

The level of the frequency spectrum at a time t+2 is smaller than the level of the frequency spectrum at the time t+1 by the threshold P2 or more. Thus, in the reduction process B, as expressed in the formula (7) below, the level of the frequency spectrum at the time t+1 is attenuated to the level of the frequency spectrum at the time t. The hatched portion 813 indicates a frequency spectrum reduced by the reduction process B.

$$L[t+1][n] \leftarrow L[t][n] \quad (7)$$

The above processing is also similarly executed in intervals T803 and T804.

Next, in the interval T802, the level of the frequency spectrum at a time t+1 is not smaller than the frequency spectrum at a time t when short-term noise is detected, by the threshold P2 or more. Thus, the reduction process B is not executed on the frequency spectrum at the time t.

The level of the frequency spectrum at a time t+2 is not smaller than the level of the frequency spectrum at the time t+1 by the threshold P2 or more. Thus, the reduction process B is not executed on the frequency spectrum at the time t+1, either.

This is the description of the reduction processes A and B with reference to FIGS. 8A to 8D. Next, the reduction process C is described.

Figure 9A:
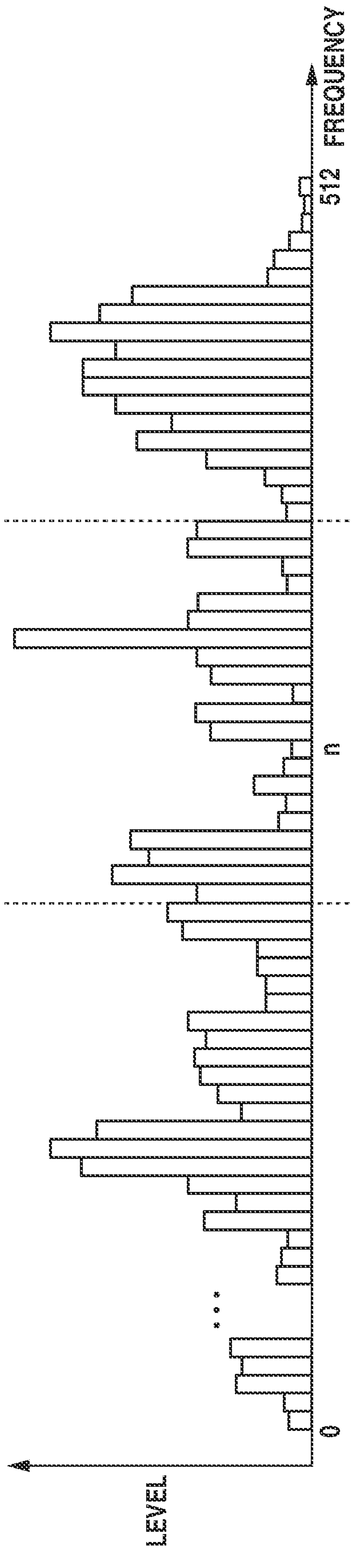
FIGS. 9A and 9B are examples of a frequency spectrum in a short-term noise reduction process C performed by the short-term noise processing unit according to one or more aspects of the present disclosure.
Figure 9B:
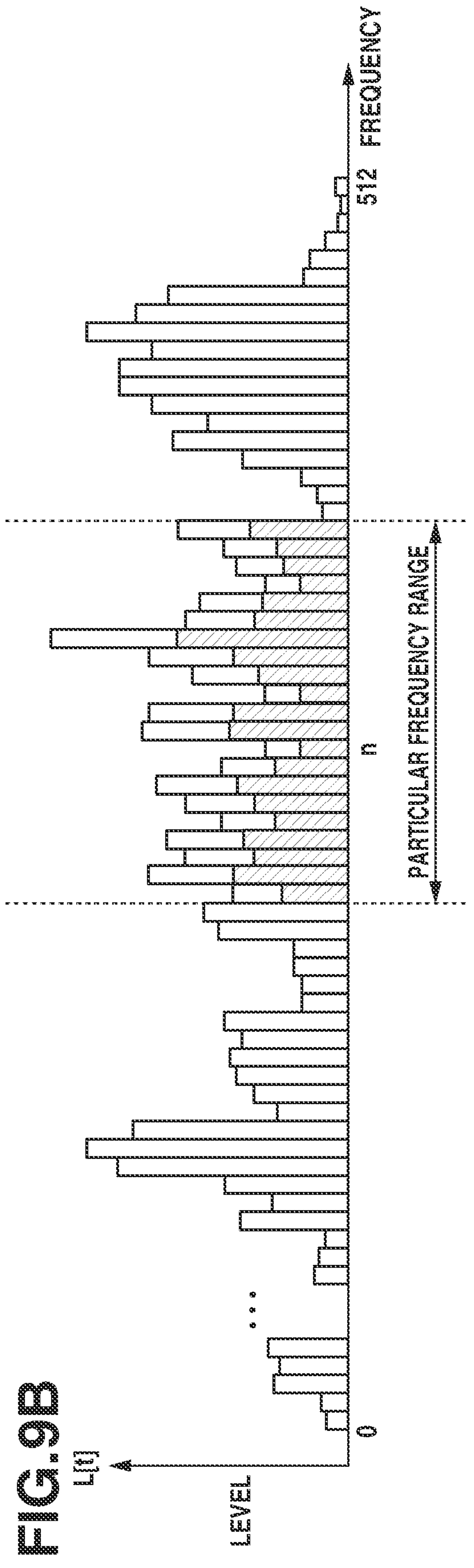

FIGS. 9A and 9B are diagrams illustrating examples of frame data L at a time t and a time t−1. In each of FIGS. 9A and 9B, the vertical axis represents the level, and the horizontal axis represents the frequency.

A case is described where short-term noise is detected at the time t.

FIG. 9A is an example of frame data L[t−1] on a frequency spectrum immediately before the short-term noise is detected (at the time t−1). The short-term noise subtraction processing unit 211 calculates an average value L_ave[t−1] in a particular frequency range at the time t−1.

FIG. 9B is an example of frame data L[t] on a frequency spectrum at the time when the short-term noise is detected (the time t).

A plain portion (including a shaded portion) indicates the level of a frequency spectrum input to the short-term noise subtraction processing unit 211. A shaded portion indicates the level of a frequency spectrum subjected to the reduction process C. The short-term noise subtraction processing unit 211 calculates an average value L_ave[t] in the particular frequency range at the time t. The short-term noise subtraction processing unit 211 determines that L_ave[t] is greater than L_ave[t−1].

Thus, in the subtraction process C, processing is performed to bring the average value L_ave[t] close to the average value L_ave[t−1]. As expressed in the formula (8) below, the short-term noise subtraction processing unit 211 calculates the ratio between the average values L_ave[t] and L_ave[t−1] and performs processing to bring the average value L_ave[t] close to the average value L_ave[t−1] based on the calculated ratio.

$$L[t][n] \leftarrow L[t][n] \times (L\_ave[t-1]/L\_ave[t]) \quad (8)$$

This is the description of the reduction process C.

As described above, based on the amount of change in noise, the imaging apparatus 100 further reduces short-term noise from a sound signal obtained by reducing noise and thus can generate a higher-quality sound.

Noise Parameters

FIG. 10 is examples of noise parameters recorded in the noise parameter recording unit 206 according to the present exemplary embodiment. The noise parameters are parameters for correcting a sound signal generated by the noise microphone 201*c* acquiring a driving sound generated within the housing of the imaging apparatus 100 and within the housing of the optical lens 300. As illustrated in FIG. 10, PLxA, PRxA, PLxB, and PRxB are recorded in the noise parameter recording unit 206. A description is given on the assumption that PLxA and PRxA are used in a case where the generation source of the driving sound is within the housing of the optical lens 300. The driving sound generated within the housing of the optical lens 300 is transmitted into the housing of the imaging apparatus 100 via the lens mount 301 and acquired by the L-microphone 201*a*, the R-microphone 201*b*, and the noise microphone 201*c*.

A plurality of noise parameters for the types of the optical lens 300 is recorded in the noise parameter recording unit 206. This is because the frequency of the driving sound differs depending on the type of the optical lens 300. The imaging apparatus 100 generates noise data using a noise parameter for the type of the optical lens 300 among the plurality of noise parameters.

Since the frequency of the driving sound differs depending on the type of the driving sound, the imaging apparatus 100 records a plurality of noise parameters for the types of driving sounds (noise). Then, the imaging apparatus 100 generates noise data using any of the plurality of noise parameters. The imaging apparatus 100 records a noise parameter for white noise as a parameter for constant noise. For example, the imaging apparatus 100 also records a noise parameter for short-term noise to be generated by the meshing of gears in the optical lens 300. For example, the imaging apparatus 100 also records a noise parameter for a sliding contact sound within the housing of the lens 300 as a parameter for long-term noise.

In the present exemplary embodiment, the imaging apparatus 100 also records noise parameters for constant noise as PLxB and PRxB in accordance with the settings of moving image capturing. The constant noise is, for example, white noise or the floor noise or the electrical noise of a microphone. The constant noise also changes in accordance with a setting regarding moving image capturing, such as the resolution, the white balance, the tint, or the frame rate. Thus, the imaging apparatus 100 records noise parameters for constant noise in accordance with the settings of moving image capturing.

The average value of the values of coefficients for PLxA and PRxA is greater than the average value of the values of coefficients for PLxB and PRxB. This is because noise to be reduced using PLxA and PRxA is greater in sound volume and more unpleasant to the ear than noise to be reduced using PLxB and PRxB.

Other Exemplary Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) f), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-087690, filed May 25, 2021, which is hereby incorporated by reference herein in its entirety.

What is claimed is:

1. A sound processing apparatus comprising:
a first microphone that acquires an environmental sound;
a second microphone that acquires noise from a noise source;
a processor; and
a memory that stores a program that, when executed by the processor, causes the sound processing apparatus to function as:
a first conversion unit configured to perform Fourier transform on a sound signal acquired by the first microphone to generate first sound data;
a second conversion unit configured to perform Fourier transform on a sound signal acquired by the second microphone to generate second sound data;
a first reduction unit configured to generate noise data based on the second sound data and reduce noise from the noise source in the first sound data using the noise data;
a detection unit configured to, based on the second sound data, detect short-term noise from the noise source;
a second reduction unit configured to, in a case where the short-term noise from the noise source is detected by the detection unit, control a magnitude of sound data output from the first reduction unit to reduce the short-term noise from the noise source in the sound data output from the first reduction unit; and
a third conversion unit configured to perform inverse Fourier transform on sound data output from the second reduction unit.

2. The sound processing apparatus according to claim 1, wherein in a case where a magnitude of sound data of a second frame subsequent to a first frame in the sound data output from the first reduction unit is greater than a magnitude of sound data of the first frame by a threshold or more, the second reduction unit reduces the magnitude of the sound data of the second frame.

3. The sound processing apparatus according to claim 2, wherein in a case where the magnitude of the sound data of the second frame is reduced, the second reduction unit changes a value of the threshold from a first value to a second value smaller than the first value, and in a case where a magnitude of a sound signal of a third frame subsequent to the second frame is greater than the magnitude of the sound signal of the second frame whose magnitude has been reduced by the second value or more, the second reduction unit reduces the magnitude of the sound data of the third frame.

4. The sound processing apparatus according to claim 2, wherein in a case where the magnitude of the sound data of the second frame is greater than the magnitude of the sound data of the first frame by the threshold or more, the second reduction unit changes the magnitude of the sound data of the second frame to a value greater than the magnitude of the sound data of the first frame by a value of the threshold.

5. The sound processing apparatus according to claim 1, wherein in a case where an average value of magnitudes of pieces of sound data in a predetermined frequency range in the second frame is greater than an average value of magnitudes of pieces of sound data in the predetermined frequency range in the first frame, the second reduction unit reduces a magnitude of a sound signal of the second frame.

6. The sound processing apparatus according to claim 1, wherein in a case where a magnitude of the second sound data is greater than or equal to a threshold, the detection unit detects that the short-term noise is generated.

7. The sound processing apparatus according to claim 6, wherein in a case where the magnitude of the second sound data is greater than or equal to the threshold in a predetermined number of successive frames, the detection unit does not detect that the short-term noise is generated.

8. The sound processing apparatus according to claim 1,
wherein the noise source includes a motor, and
wherein in a case where the motor is not being driven, the detection unit does not perform the detection.

9. The sound processing apparatus according to claim 1, wherein the first reduction unit generates the noise data corresponding to long-term noise and the short-term noise from the noise source and subtracts the noise data from the first sound data.

10. The sound processing apparatus according to claim 1, wherein the program, when executed by the processor, further causes the sound processing apparatus to function as a third reduction unit configured to reduce constant noise other than the noise from the noise source in the sound data output from the second reduction unit.

11. The sound processing apparatus according to claim 1, wherein the noise source is a motor configured to drive a lens.

12. A sound processing method comprising:
acquiring an environmental sound using a first microphone;
acquiring noise from a noise source using a second microphone;
performing Fourier transform on a sound signal acquired by the first microphone to generate first sound data;
performing Fourier transform on a sound signal acquired by the second microphone to generate second sound data;
performing a first reduction process for generating noise data based on the second sound data and reducing noise from the noise source in the first sound data using the noise data;
based on the second sound data, detecting short-term noise from the noise source;
performing a second reduction process for, in a case where the short-term noise from the noise source is detected in the detecting, controlling a magnitude of sound data subjected to the first reduction process to reduce the short-term noise from the noise source in sound data subjected to the first reduction process; and
performing inverse Fourier transform on sound data subjected to the second reduction process.

* * * * *